(12) United States Patent
Papageorgiou et al.

(10) Patent No.: US 12,265,097 B2
(45) Date of Patent: *Apr. 1, 2025

(54) SYSTEM AND METHOD FOR DETERMINING DISPENSING VOLUME FOR A LIQUID HANDLER

(71) Applicant: Spaero Inc., San Francisco, CA (US)

(72) Inventors: Dimitris Papageorgiou, San Francisco, CA (US); Mitchell Adler, San Francisco, CA (US)

(73) Assignee: Spaero Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/412,096

(22) Filed: Jan. 12, 2024

(65) Prior Publication Data

US 2024/0192246 A1    Jun. 13, 2024

Related U.S. Application Data

(63) Continuation of application No. 18/225,399, filed on Jul. 24, 2023, now Pat. No. 11,913,967.

(Continued)

(51) Int. Cl.
*G01N 35/10* (2006.01)
*G06T 7/10* (2017.01)
(Continued)

(52) U.S. Cl.
CPC ........... *G01N 35/1016* (2013.01); *G06T 7/10* (2017.01); *G06T 7/20* (2013.01); *G06T 7/62* (2017.01);
(Continued)

(58) Field of Classification Search
CPC ....... G01N 35/1016; G06T 7/10; G06T 7/215; G06T 7/20; G06T 7/60; G06T 7/62;
(Continued)

(56) References Cited

U.S. PATENT DOCUMENTS 5,627,522 A    5/1997   Walker et al.
7,814,788 B2  10/2010   Halaka et al.
(Continued)

FOREIGN PATENT DOCUMENTS

JP          2020003274 A   *   1/2020

OTHER PUBLICATIONS

"Echo 525 Acoustic Liquid Handler", Beckman Coulter Life Sciences, first downloaded Feb. 10, 2022, https://www.beckman.com/liquid-handlers/echo-525#features-wrapper.
(Continued)

*Primary Examiner* — John Fitzgerald
*Assistant Examiner* — Truong D Phan
(74) *Attorney, Agent, or Firm* — Jeffrey Schox; Annabel Imbrie-Moore

(57) ABSTRACT

In variants, the method for determining dispensing volume for a liquid handler 110 can include: dispensing a droplet using the liquid hander 110, sampling a set of measurements of the droplet, determining the droplet volume based on the set of measurements, and/or any other suitable steps. In variants, the system 100 can include: the liquid handler 110, a droplet vessel 130, a measurement system 150, and/or any other suitable components.

20 Claims, 28 Drawing Sheets

Related U.S. Application Data

(60) Provisional application No. 63/391,507, filed on Jul. 22, 2022, provisional application No. 63/398,055, filed on Aug. 15, 2022, provisional application No. 63/448,098, filed on Feb. 24, 2023.

(51) Int. Cl.
  G06T 7/20 (2017.01)
  G06T 7/62 (2017.01)
  G06V 10/764 (2022.01)

(52) U.S. Cl.
  CPC .. G06V 10/764 (2022.01); *G06T 2207/20081* (2013.01)

(58) Field of Classification Search
  CPC ....... G06T 2207/20081; G06V 10/764; A61M 5/1411; A61M 5/14
  See application file for complete search history.

(56) References Cited

U.S. PATENT DOCUMENTS

| | | | |
|---|---|---|---|
| 8,468,885 | B2 | 6/2013 | Berndt et al. |
| 11,506,588 | B1* | 11/2022 | Abdollahi .......... G01N 15/0227 |
| 2013/0136672 | A1 | 5/2013 | Blumentritt et al. |
| 2015/0060700 | A1 | 3/2015 | Bjornson et al. |
| 2018/0256817 | A1* | 9/2018 | Ohwada ............ A61M 5/16804 |
| 2019/0005304 | A1 | 1/2019 | Adalsteinsson et al. |
| 2019/0366338 | A1 | 12/2019 | Yantz et al. |
| 2021/0223163 | A1 | 7/2021 | Nugent et al. |

OTHER PUBLICATIONS

"How do I improve my pipetting results?", Hamilton, first downloaded Feb. 10, 2022, https://www.hamiltoncompany.com/automated-liquid-handling/platforms/microlab-prep/prep-help/how-do-i-improve-my-pipetting-results.

Berry, Joseph D., et al., "Measurement of surface and interfacial tension using pendant drop tensiometry", Journal of Colloid and Interface Science 454 (2015) 226-237.

Harz, M., et al., "Droplet sizing using silicone oils", Crop Protection 20 (2001) 489-498.

Lu, Shizhou, et al., "A Novel Approach to Droplet's 3D Shape Recovery Based on Mask R-CNN and Improved Lambert-Phong Model", Micromachines 2018, 9, 462, doi:10.3390/mi9090462.

Mullins, Benjamin J., et al., "Effect of fiber orientation on fiber wetting processes", Journal of Colloid and Interface Science 269 (2004) 449-458.

Thurow, Kerstin, et al., "A Fast Optical Method for the Determination of Liquid Levels in Microplates", Journal of Automated Methods and Management in Chemistry, vol. 2011, Article ID 805153, 6 pages.

* cited by examiner

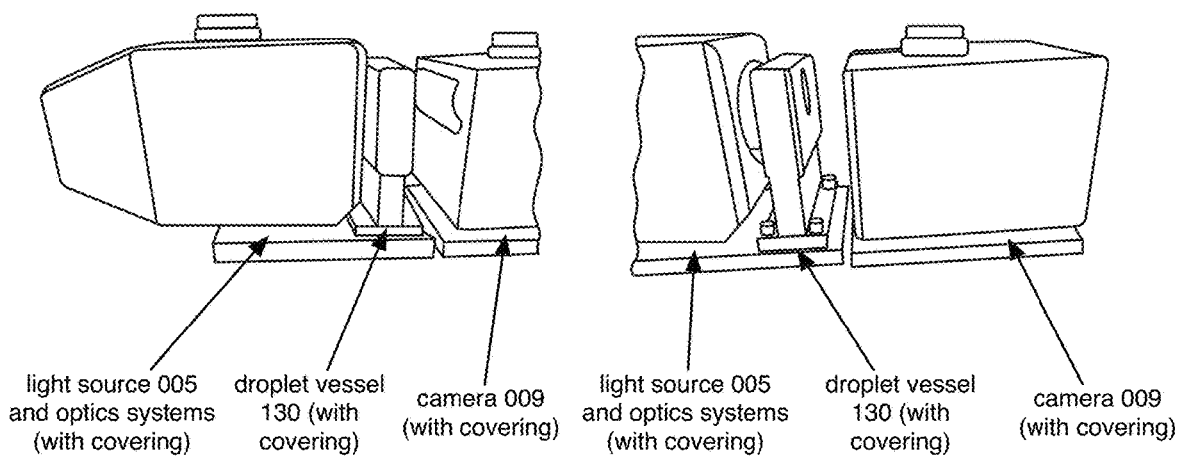
FIGURE 19A
FIGURE 19B
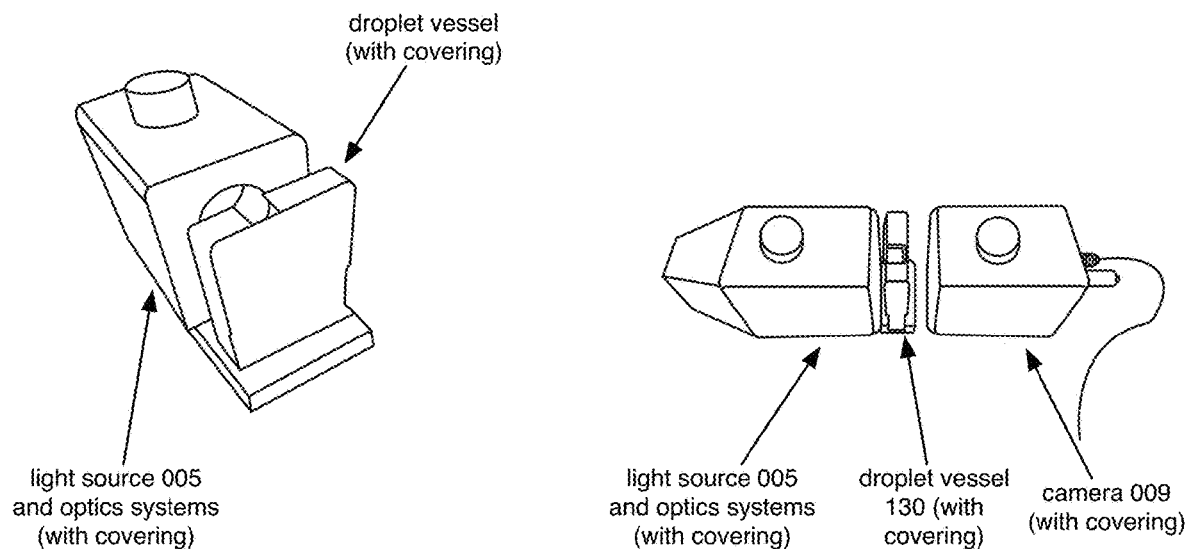
FIGURE 19C
FIGURE 19D

001: Light source/ Optics cover; SPRO-LQC-CVR-V2.0
002: Camera cover; SPRO-LQC-CVR-v
003: Cuvette cover;
004: Cuvette holder (currently holds 4 cuvettes)
005: LED source
006: LED source holder
007: Diffuser (varying grit size)
008: Collimator
009: Camera body
010: Camera linear guide rail
011: 1-D translational stage
012: linear guide rail
013: SBS format base plate
014: SBS format base plate

SYSTEM AND METHOD FOR DETERMINING DISPENSING VOLUME FOR A LIQUID HANDLER

CROSS-REFERENCE TO RELATED APPLICATIONS

This application is a continuation of U.S. application Ser. No. 18/225,399 filed 24 Jul. 2023, which claims the benefit of U.S. Provisional Application No. 63/391,507 filed 22 Jul. 2022, U.S. Provisional Application No. 63/398,055 filed 15 Aug. 2022, and U.S. Provisional Application No. 63/448,098 filed 24 Feb. 2023, each of which is incorporated in its entirety by this reference.

TECHNICAL FIELD

This invention relates generally to the liquid handling field, and more specifically to a new and useful system and method in the liquid handling field.

BRIEF DESCRIPTION OF THE FIGURES

FIGS. 19A-19D depict additional examples of the droplet analysis system.

DETAILED DESCRIPTION

The following description of the embodiments of the invention is not intended to limit the invention to these embodiments, but rather to enable any person skilled in the art to make and use this invention.

1. OVERVIEW

Figure 1:
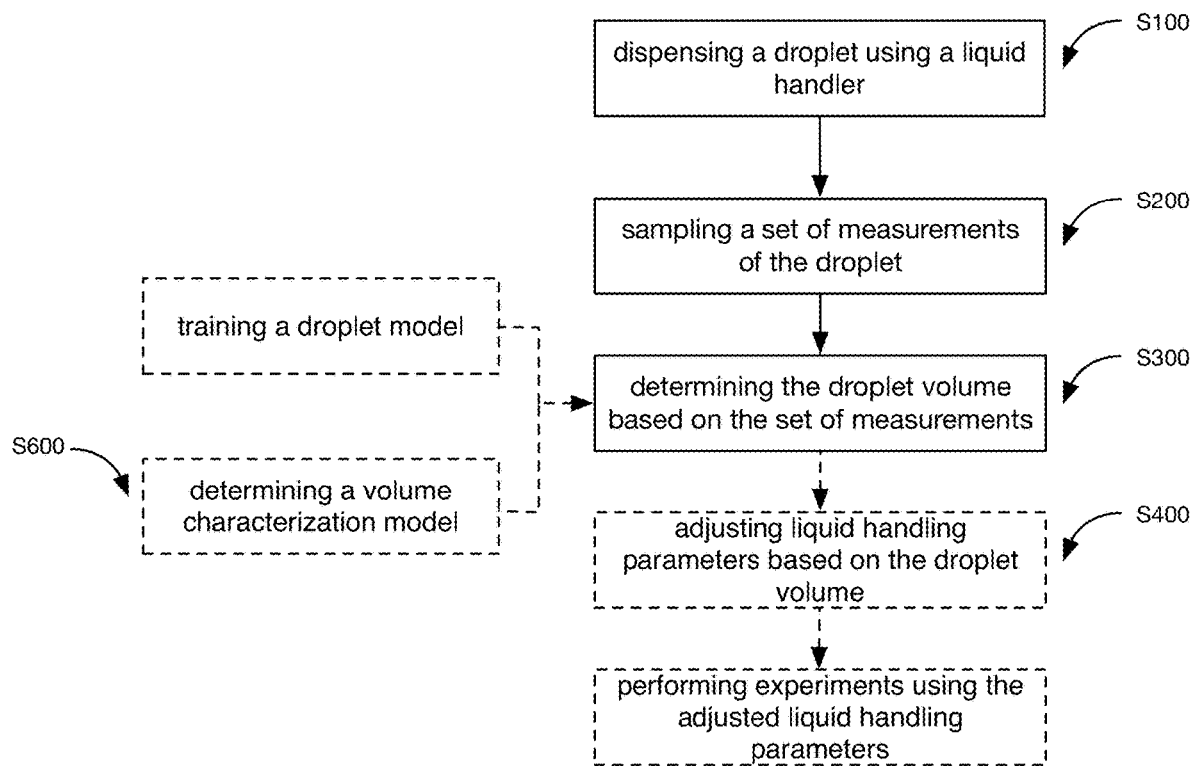
FIG. 1 is a schematic representation of a variant of the method.

As shown in FIG. 1, the method can include: dispensing a droplet using a liquid hander S100, sampling a set of measurements of the droplet S200, and determining the droplet volume based on the set of measurements S300. However, the method can additionally or alternatively include any other suitable steps.

Figure 2:
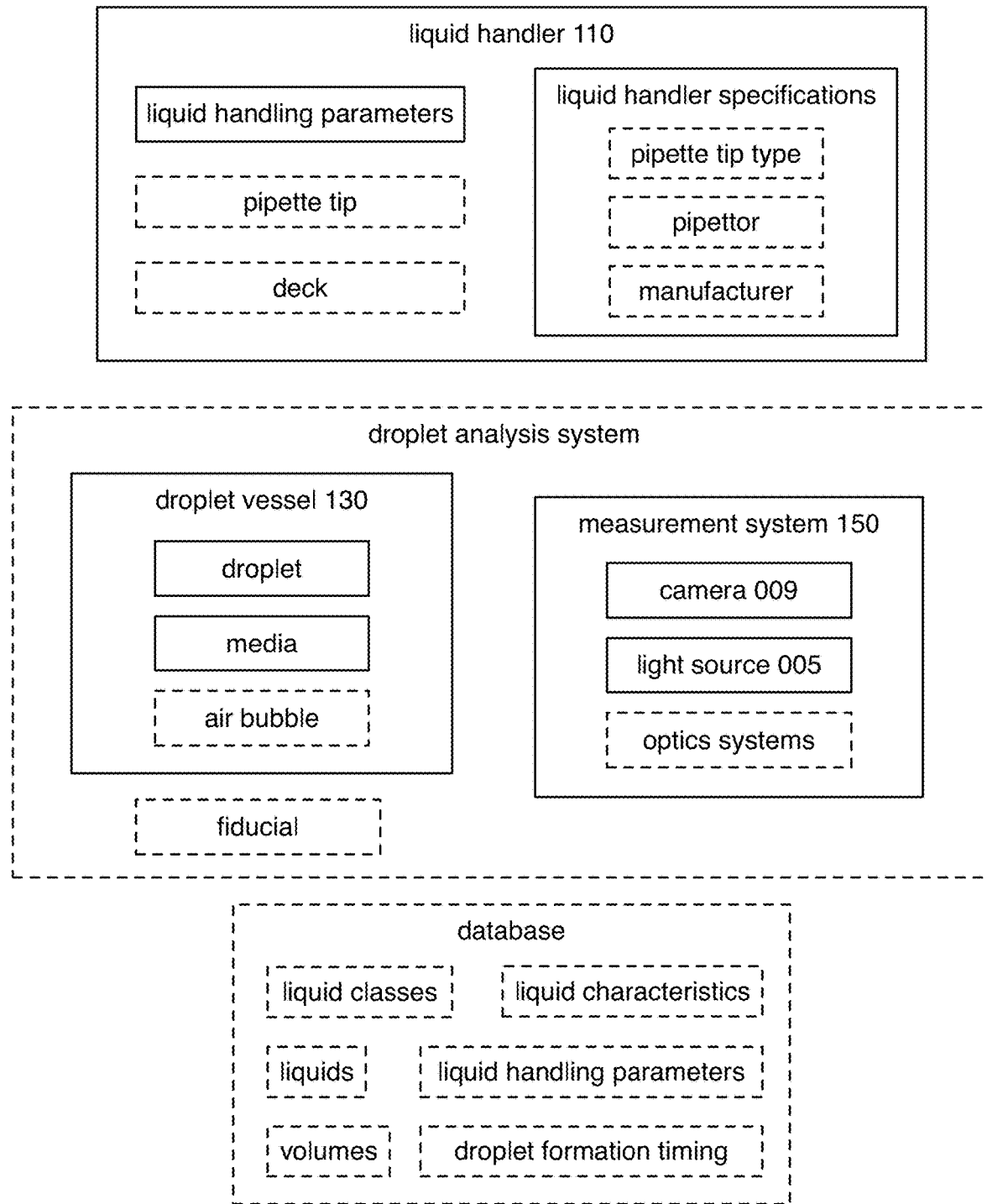
FIG. 2 is a schematic representation of a variant of the system.

As shown in FIG. 2, the system 100 can include: a liquid handler 110, a droplet vessel 130, and a measurement system 150. However, the system 100 can additionally or alternatively include any other suitable components.

In variants, the system and/or method can function to: calibrate a liquid handler (e.g., for a specific liquid), perform quality checks (e.g., quality control, experimental validation, etc.) on the liquid handler, and/or characterize a liquid.

2. EXAMPLES

In an example, the system 100 can interface with a liquid handling robot to provide an image-based volume estimation of one or more droplets dispensed by the liquid handling robot. An example of the system 100 can include a camera 009, a light source 005, additional optics components, and a droplet vessel 130 holding a continuum media. An example of the method can include sampling images of a droplet of interest as it is dispensed by the liquid handling robot into the continuum media (e.g., during and/or after separation of the droplet from a pipette tip of the liquid handling robot) and estimating droplet volume based on the images. In a specific example, the method can include: sampling a video, detecting a droplet of interest (e.g., distinguished from air bubbles and/or other liquid droplets) in the video using a trained droplet model (e.g., a droplet detector), tracking the droplet location and/or size across frames of the video, selecting a subset of video frames based on the tracked location and/or size, determining a 2D geometric characteristic (e.g., radius, diameter, etc.) of the droplet using the subset of frames, and estimating the droplet volume based on the 2D geometric characteristic using a volume characterization model (e.g., a linear regression model). Additionally or alternatively, the droplet volume can be determined directly from the droplet segment(s) (e.g., based on the size of the image region or number of pixels occupied by the droplet segment). In specific examples, the determined volume can be used for: calibrating the liquid handling robot (e.g., calibrating dispensing and/or aspiration parameters for the droplet liquid); quality control (e.g., checking dispensing volumes pre- and/or post-experiment); flagging volume discrepancies to a user; adjusting experiment protocols (e.g., by increasing or decreasing the aspiration and/or dispensation duration or pressure to achieve a target droplet volume); measuring small pipetting volumes (e.g., less than 10 μL, less than 1 μL, etc.); and/or any other use cases. In an illustrative example, the determined volume can be used to calibrate the dispensing volume and/or aspiration volume of the liquid handler.

3. TECHNICAL ADVANTAGES

Variants of the technology can confer one or more advantages over conventional technologies.

Conventional methods of achieving liquid dispensing accuracy (e.g., accuracy suitable for a commercial system) require an automation engineer to manually program a liquid handling robot for each liquid class in an experiment—which involves extensive time and expertise—or require a person skilled in the art of pipetting to perform the experiment by hand. Additionally, liquid handler dispensing volume inaccuracies (e.g., dispensing volume drift) can occur while performing long assays (e.g., due to oscillations and/or perturbations, due to a stepper motor skipping steps, etc.), after a long-term hiatus from using the liquid handler, and/or manufacturing discrepancies and/or variances between the channels in a multi-channel pipettor head. Variants of the technology can increase dispensing accuracy of a liquid handler and decrease the calibration programming time for the liquid handler by automatically calibrating the liquid handler. In an example, variants of the technology can increase dispensing accuracy at small volumes (e.g., less than 10 μL, less than 1 μL, less than 100 nL, etc.). In a specific example, the dispensing volume can be less than the minimum volume specified by the liquid handler system and/or less than the minimum volume needed for volume estimation using flow meters, optical density methods, gravimetric methods, combinations thereof, and/or any other volume measurement method.

In variants, the method can be agnostic to a given liquid handler specification (e.g., pipette tip type, number of pipettor channels, liquid handler manufacturer, etc.) and/or protocol specification (e.g., liquid type, target dispensing volume, etc.). For example, the same method can be applied across different liquid handler specification and/or protocol specification to calibrate the liquid handler for each experiment stage. Thus, the method can decrease liquid handler programming time by not requiring an expert to manually program the liquid handler for each experiment stage, increase the dispensing accuracy by tuning the liquid handling parameters for a given liquid handler specification and/or protocol specification, and/or increase the types of experiments that can be performed by using different equipment (e.g., tips) from those originally specified in an experiment.

In conventional methods of liquid dispensing, the dispensing volume and/or measurements of the dispensing volume can be influenced by external perturbations (e.g., there is no dampening when the dispensing the continuum media is air). In variants, the method can be uninfluenced by external perturbations and/or oscillations caused by humans, the robot itself, and/or any other objects or events outside the dispensing field of view (FOV). In a specific example, the dynamics of liquid dispensing are governed solely or predominately by the viscosity of the liquid continuum media (e.g., as in the case of silicone oil with varying viscosities).

However, further advantages can be provided by the system and method disclosed herein.

4. SYSTEM

As shown in FIG. 2, the system 100 can include: a liquid handler 110, a droplet vessel 130, and a measurement system 150. The system 100 can optionally include a computing system, a database, and/or any other suitable components.

The liquid handler 110 (e.g., a pipetting system) can be or include a liquid handling robot, a manual pipettor, and/or any other pipetting system. In a specific example, the liquid handler 110 can include a liquid handling robot (e.g., a custom robot and/or a third-party robot), an associated software system, a deck, sensors (e.g., pressure sensor), and/or any other suitable components. The liquid handler 110 can include a single channel pipettor, a multi-channel pipettor (e.g., wherein a droplet can be dispensed from a single channel, wherein each channel is used to dispense a droplet, etc.), and/or any other pipettor system. The liquid handler 110 preferably includes and/or interfaces with one or more pipette tips. All or portions of the liquid handler 110 can be transparent, translucent, opaque, and/or have any other suitable visible clarity. For example, the liquid handler 110 can include a substantially opaque pipette tip (e.g., at least 75% opacity, at least 90% opacity, at least 95% opacity, at least 98% opacity, 100% opacity, etc.).

The liquid handler 110 can perform one or more operations, including: aspirating, dispensing, moving (e.g., to a new sample, between samples, etc.), experimental operations (e.g., diluting samples, transferring samples, washing samples, colony picking, etc.), collecting measurements (e.g., force, pressure, temperature, weight and/or mass, etc.), and/or any other operations. In a first example, the liquid handler 110 can dispense one or more droplets of a liquid sample. In a specific example, the liquid handler 110 can aspirate a first volume of liquid from a sample container according to a set of aspiration parameters, and dispense one or more droplets of the liquid into a continuum media within a droplet vessel 130 according to a set of dispensing parameters and a target volume (e.g., a target total volume of the dispensed liquid, a target volume for each droplet, etc.). In a second example, the liquid handler 110 can collect pressure measurements within a pipettor channel of the liquid handler 110 (e.g., during aspiration, during dispensing, etc.). In a third example, the liquid handler 110 can perform a series of operations in accordance with an experimental protocol.

The liquid handler 110 can optionally include and/or interface with a deck (e.g., a workspace). The deck can retain and/or interface with: platforms, (physical) containers (e.g., wells, vials, vessels, cuvettes, cartridges, etc.) for samples, the measurement system 150, and/or any other components. In an example, the deck can include features that can interface with (e.g., mate with) components that corresponds to a Society for Biomolecular Screening (SBS) footprint and/or an American National Standards Institute (ANSI)/Society for Laboratory Automation and Screening (SLAS) footprint. However, the deck can be otherwise configured.

The liquid handler 110 can optionally be associated with a set of liquid handler specifications, which can include:

actuation parameters (e.g., rate of movement, number of degrees of freedom, origin location, actuation error, etc.), manufacturer information (e.g., make and/or model of the liquid handler 110), number of pipetting channels, pipette tip type, pipette tip size, pipette tip geometry, pipette tip material, distance between pipette tips, calibration information, deck specifications (e.g., deck locations), dispensing mode, and/or any other specifications. Examples of dispensing modes include surface mode (e.g., aspirate and/or dispense from the surface of the sample) part low volume mode (e.g., dispensing volumes smaller than some amount such as 50 uL), pre/post aliquot volumes, and/or any other mode.

However, the liquid handler 110 can be otherwise configured.

A set of liquid handling parameters can be used to control one or more liquid handler operations. For example, the liquid handler 110 can be controlled to (automatically) aspirate, dispense, and/or otherwise perform any other operations according to the set of liquid handling parameters. Liquid handling parameters can include: aspirating parameters, dispensing parameters, actuation parameters, and/or any other parameters. Dispensing parameters can include: dispensing flow rate, mix flow rate, stop flow rate, blow out volume, stop back volume, air transport volume, swap speed, settling time, dispense pressure (e.g., pressure applied by a pipettor drive shaft/plunger), dispense volume (e.g., droplet volume, total volume, etc.), dispense pattern (e.g., for an array of multiple droplets), valve open/close duration, dispensing error, control signal values (e.g., wherein the control signal drives the dispense rate, dispense pressure, any other dispensing parameter, etc.), values thereof (e.g., minimum values, maximum values, target values, calibrated values, etc.), ranges thereof, and/or any other pipetting parameters. Aspirating parameters can include: jet mode, aspirating flow rate, mix flow rate, clot out volume, air transport volume, swap speed, settling time, over aspirate volume, clot retract height, aspiration delay (e.g., after aspirating, before moving away from the sample), aspiration pressure (e.g., pressure applied by a pipettor drive shaft/plunger), aspiration volume (e.g., transfer volume), valve open/close duration, aspiration error, control signal values (e.g., wherein the control signal drives the aspiration rate, aspiration pressure, aspiration volume, any other aspiration parameter, etc.), values thereof (e.g., minimum values, maximum values, target values, calibrated values, etc.), ranges thereof, and/or any other pipetting parameters. Liquid handling parameters can optionally include: liquid handling techniques (e.g., liquid handling parameters used to control the liquid handler given an aspiration volume and/or dispensing volume) and volume parameters (e.g., aspiration volume, dispensing volume, a calibration curve correcting aspiration and/or dispensing volume, etc.). Liquid handling parameters can optionally be associated with one or more liquid handler specifications. For example, each dispensing mode can be associated with a set of corresponding liquid handling parameters.

Figure 4:
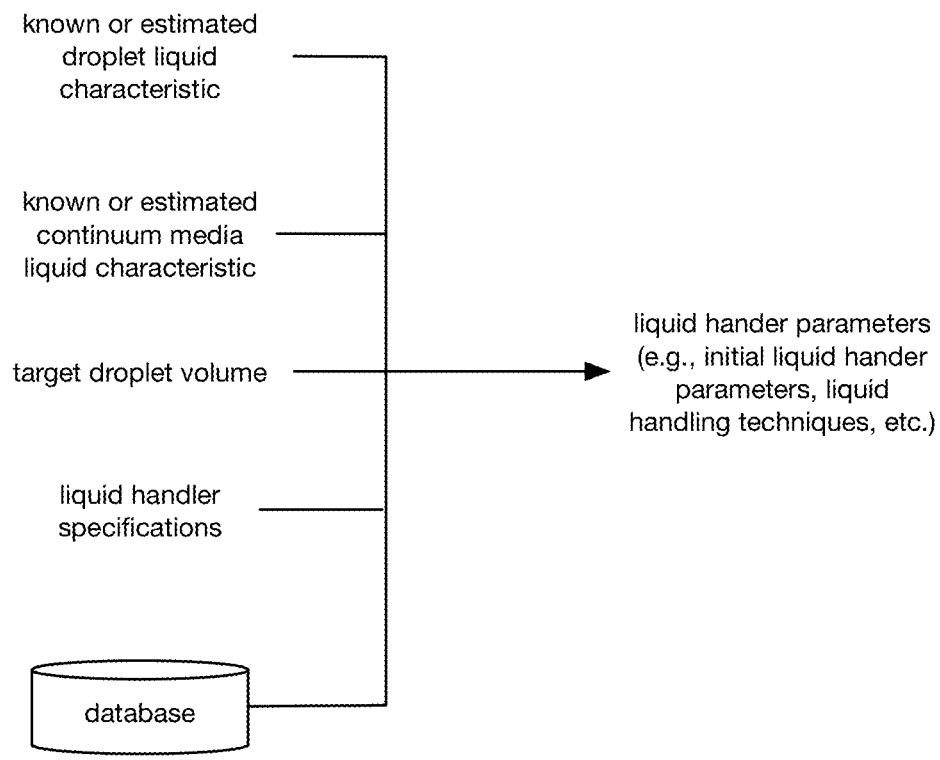
FIG. 4 depicts an example of determining liquid handling parameters (e.g., initial liquid handling parameters).

The liquid handling parameters can be predetermined, determined (e.g., selected) using the database, determined using a model, determined based on one or more measurements, determined using all or parts of S400, and/or otherwise determined. All or a portion of liquid handling parameters can optionally be pre-calibrated (e.g., via a previous iteration of all or parts of the method, via a separate calibration procedure, etc.), wherein a set of liquid handling parameter values (e.g., pressure, rate, valve duration, control signal values, etc.) are determined for each of a set of target dispense volumes. All or a portion of liquid handling parameters (e.g., the liquid handling techniques) can optionally be determined (e.g., initially set prior to S100) based on: liquid characteristics for the droplet liquid and/or the continuum media (e.g., an aspiration rate parameter determined based on viscosity of the droplet liquid), continuum media volume, target volume, liquid handler specifications (e.g., pipette tip geometry, liquid handler make/model, etc.), temperature of the droplet liquid and/or the continuum media, measurements (e.g., calibration measurements), user inputs, an initial volume estimate (e.g. a volume estimated based on the pipette tip geometry and an image of a sample within a transparent pipette tip showing the meniscus location), information in the database (e.g., known associations between liquid handling parameters and dispensing volumes), measurements from one or more liquid handler sensors (e.g., capacitive liquid level sensors and/or pressure liquid level sensors can be used to trigger a liquid handler operation and/or adjust liquid handler parameters), and/or any other information. An example is shown in FIG. 4. Examples of liquid characteristics include: liquid type (e.g., composition of the liquid), viscosity, surface tension, density, hydrophobicity, miscibility (e.g., of the droplet liquid and the continuum media), a liquid characteristic proxy (e.g., sample measurements associated with one or more liquid characteristics), relative liquid characteristics between the droplet liquid and continuum media, and/or any other characteristic of the droplet and/or continuum media. Liquid characteristics can optionally be associated with a liquid class (e.g., defining a set of liquids with similar liquid characteristics). However, the liquid handling parameters can be otherwise configured.

Liquid characteristics can be known, estimated, calculated, selected (from the database), and/or otherwise determined. In a first specific example, viscosity of the droplet liquid can be estimated using a pipettor pressure curve measured while pipetting the droplet liquid (e.g., using conductivity measurements, force measurements, etc.). In a second specific example, a liquid characteristic of the droplet liquid can be estimated based on the droplet liquid type (e.g., based on known liquid characteristics of constituent liquids in the droplet liquid). In a third specific example, the surface tension of the droplet liquid can be estimated using a pendant drop method (e.g., wherein all or parts of S100 can be used to sample a set of measurements of a pendant droplet in air and wherein all or parts of S300 can be used to analyze the shape of the pendant droplet to determine the surface tension of the droplet liquid). In a fourth specific example, the liquid characteristic(s) of the continuum media can be selected based on the liquid characteristic(s) of the droplet liquid (e.g., selecting a continuum media based on viscosity of the droplet liquid). However, liquid characteristics can be otherwise determined.

The system 100 can optionally define a droplet analysis system (e.g., calibration system), which can include one or more droplet vessel(s) 130 and the measurement system 150. Examples of the droplet analysis system are shown in FIG. 16, FIG. 17, FIG. 18, FIGS. 19A-19D, and FIGS. 20A-20G. The droplet analysis system preferably fits within the deck of the liquid handler 110, but can alternatively extend partially or entirely outside of the deck. The droplet analysis system can be integrated into the liquid handler 110 or be a separate (e.g., retrofit) system. The relative poses of the droplet analysis system components (e.g., droplet vessel 130, light source 005, camera 009, etc.) are preferably fixed, but can alternatively be variable. In an example, all or a portion of the droplet analysis system can be coupled to one or more platforms (e.g., base plates), wherein the platforms can interface with (e.g., mate with) the liquid handler deck. In a specific example, the platform base can have a geometry corresponding to an SBS footprint and/or an ANSI/SLAS footprint. The length of the platform base can be between 50 mm-500 mm or any range or value therebetween (e.g., 100 mm-200 m, 127.76 mm±0.25 mm, etc.), but can alternatively be greater than 50 mm or less than 500 mm. The width of the platform base can be between 25 mm-500 mm or any range or value therebetween (e.g., 50 mm-150 m, 85.48 mm±0.25 mm, etc.), but can alternatively be greater than 25 mm or less than 500 mm. The platform top can optionally overhang the platform base (e.g., overhang the SBS and/or ANSI/SLAS footprint geometry). The droplet analysis system and/or components thereof are preferably located at or near an edge of the liquid handler deck, but can alternatively be located in the middle or in any other suitable position. One or more components of the droplet analysis system can optionally include cleaning (e.g., automatic cleaning) and/or anti-static features. In specific examples, the anti-static features can reduce dust on the camera lens, in or on the droplet vessel 130, and/or on any other components.

The droplet vessel 130 holds a continuum media, wherein one or more droplets are dispensed into the continuum media. The droplet vessel 130 can be pre-filled with the continuum media, empty (e.g., wherein the continuum media is air), filled via the liquid handler 110, filled via another system, and/or otherwise configured. In a first example, the droplet vessel 130 can be refillable (e.g., auto-refillable) using a pump system interfacing with a reservoir of continuum media. In a second example, the droplet vessel 130 can be replaceable (e.g., a modular replaceable cartridge) that can optionally be pre-filled with continuum media. The droplet vessel 130 can be a cuvette, a cartridge, a vial, a tube (e.g., supporting continuum media flow, microfluidic reservoir, etc.), and/or any other container. The droplet vessel 130 is preferably transparent or semi-transparent, but can alternatively be non-transparent. The size of the droplet vessel 130 can optionally be selected based on: the liquid handler 110 (e.g., wherein the vessel is sized such that each pipette tip in a multichannel liquid handler pipette system can dispense into a vessel), the droplet target volume, and/or any other parameter. The droplet analysis system can include: the same number of droplet vessels 130 as there are pipetting channels on the pipette head, less droplet vessels 130 than the number of pipetting channels, more droplet vessels 130 than the number of pipetting channels, a predetermined number of droplet vessels 130 (e.g., 1, 2, 3, 4, 5, 6, 7, 8, etc.), and/or any other suitable number of droplet vessels 130. The droplet vessel 130 can optionally be retained by a droplet vessel holder 004 and/or partially or fully covered by a droplet vessel cover 003. The droplet vessel holder 004 and/or droplet vessel cover 003 preferably enable light to pass through a side of the droplet vessel 130 (e.g., via a transparent window, via an opening, etc.).

Figure 18:
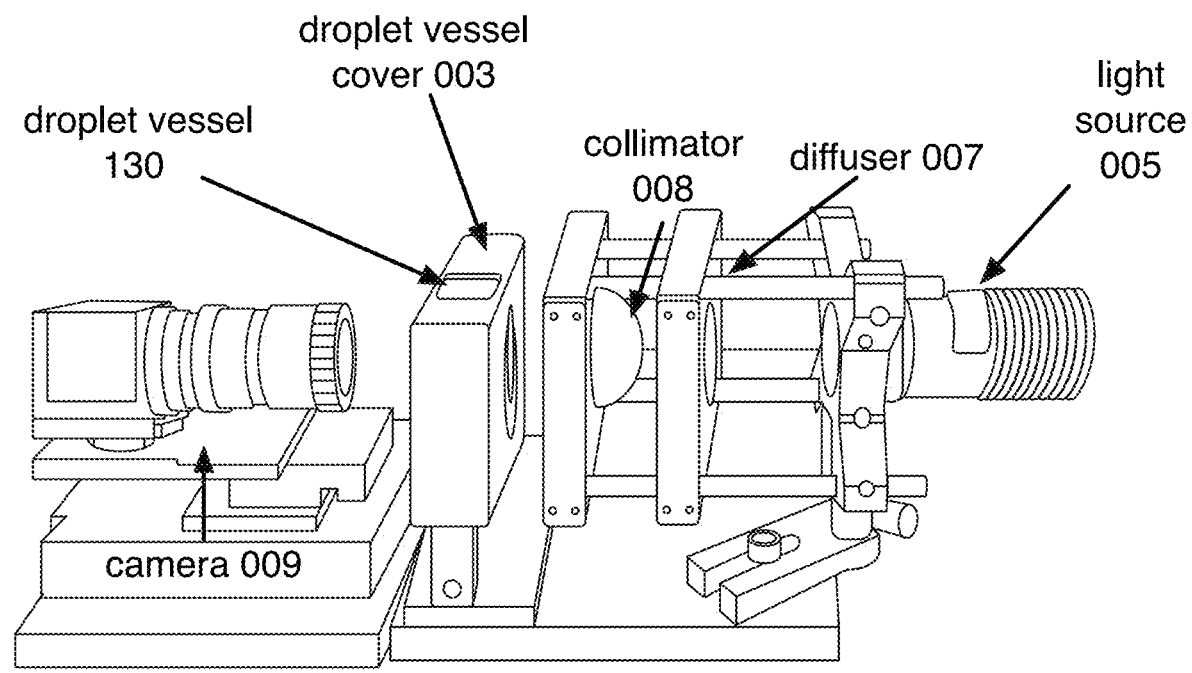
Figure 20A:
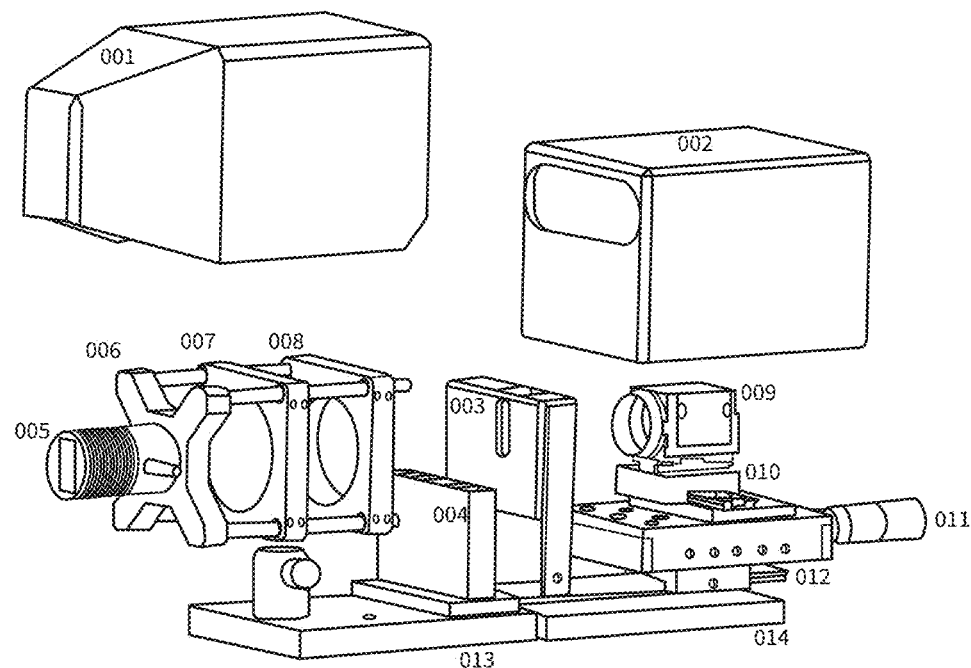
FIGS. 20A-20G depict exploded views of an example of the droplet analysis system.
Figure 20B:
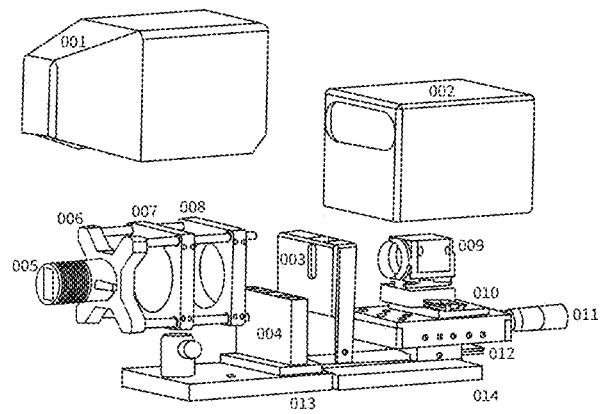
Figure 20C:
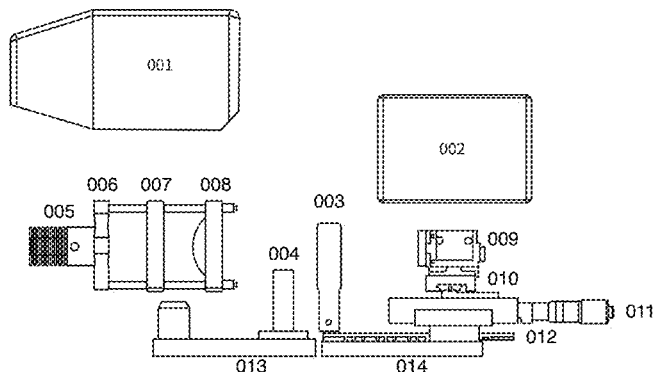
Figure 20D:
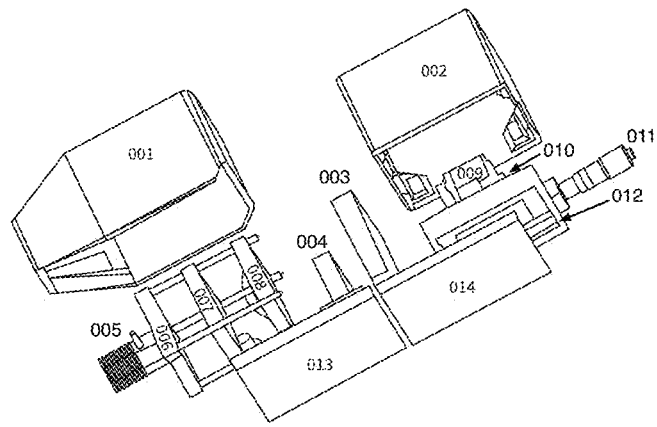
Figure 20E:
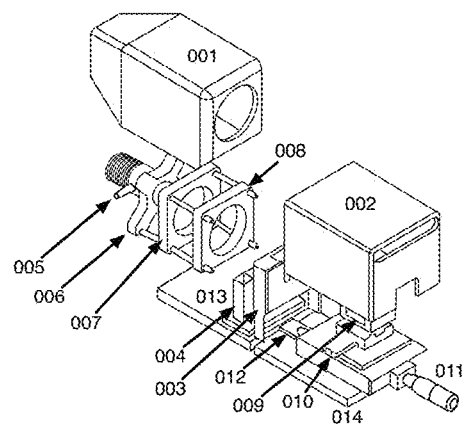
Figure 20F:
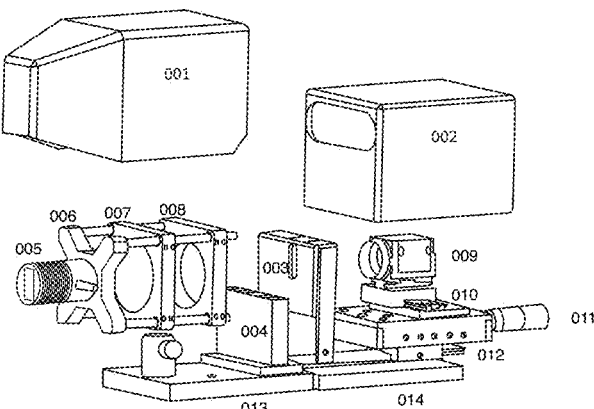
Figure 20G:
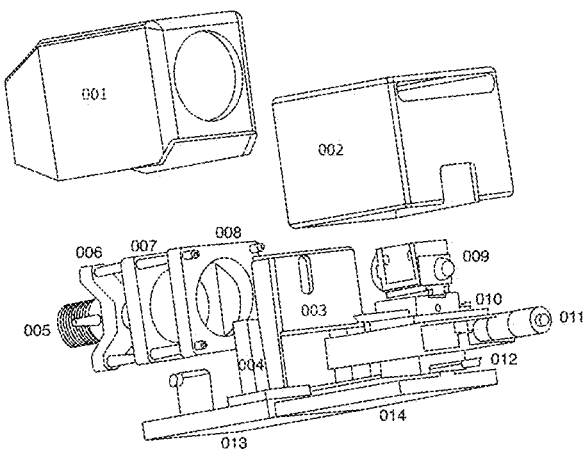

The measurement system 150 can include one or more of any: camera 009; optics system (e.g., diffuser 007, collimator 008, magnification lens, filter, etc.); and/or light source 005. The camera 009 can be or include an image sensor and/or any other light sensor (e.g., photomultiplier tubes, spectrophotometers, etc.). One or more components of the measurement system 150 can optionally be retained by a holder (e.g., light source holder 006, etc.) and/or partially or fully covered by a cover (e.g., light source cover 001, camera cover 002, etc.). The measurement system 150 can optionally include one or more translation systems (e.g., translational stages, guide rails, etc.), which can function to adjust the position of one or more measurement system components. The droplet vessel 130 is preferably located between the camera 009 and the light source 005, such that the camera 009 can record a silhouette of the droplet, but alternatively the light source 005 and camera 009 can be otherwise positioned relative to the droplet vessel 130. An example is shown in FIG. 18. In a specific example, the light source 005 can emit light such that the light passes through one or more optics systems. In an illustrative example, the light source 005 can illuminate the droplet vessel 130 by emitting light through a diffuser 007 and a collimator 008. The light source 005 can optionally be an LED board. The light source 005 can optionally emit an intensity of light determined based on a measured environment lighting (e.g., to compensate for different environments). The camera frame rate is preferably greater than 100 FPS (e.g., greater than 150 FPS, greater than 200 FPS, greater than 210 FPS, greater than 300 FPS, etc.), but can alternatively be less than 100 FPS. The distance between the camera 009 and the droplet vessel 130 can be between 1 cm-100 cm or any range or value therebetween (e.g., 5 cm-10 cm, 10 cm-20 cm, etc.), but can alternatively be less than 1 cm or greater than 100 cm. The distance between the camera 009 and the droplet vessel 130 can be static or adjustable (e.g., using a translation system actuator such as a stepper motor).

The camera 009 can optionally be used to measure liquid handler specifications. In a specific example, the camera 009 can sample an image of a pipette tip to determine the pipette tip geometry (e.g., for an unknown pipette tip). The camera 009 (or a different camera) can optionally be positioned to view all or a portion of the liquid handler deck, wherein measurements (e.g., video, images, etc.) of liquid handler operation can be associated with operation parameters (e.g., contemporaneous auxiliary measurements, control instructions, etc.), labels (e.g., determined by analyzing the measurements), and/or other information and stored in the database for subsequent analysis.

One or more components of the droplet analysis system and/or measurements acquired by the measurement system 150 can optionally be calibrated. For example, the droplet analysis system and/or sampled measurements can be calibrated using a fiducial located within the camera field of view (e.g., on or near the droplet vessel 130, on or near the droplet vessel cover 003, etc.). Examples of fiducials (e.g., fiducial markers) can include: a defined two-dimensional or three-dimensional pattern (e.g., with known dimensions), AprilTag, a liquid handler end effector, and/or any other fiducial. Specific examples of a liquid handler end effectors that can be used as fiducials includes: a pipette tip, a precision-manufactured (e.g., 0.1 mm tolerance, 0.01 mm tolerance, etc.) end effector with a known shape, and/or any other end effector. The fiducial can optionally be associated with one or more target parameters and/or known parameters within an image frame (e.g., known dimensions, target pixel dimensions, known/target scale, known/target location, known/target brightness, etc.). In a first embodiment, one or more intrinsic parameters and/or extrinsic parameters of the measurement system 150 (e.g., camera 009) can be calibrated based on an image of the fiducial (e.g., to achieve the target parameters of the fiducial). In specific examples, calibrating parameters of the measurement system 150 can include adjusting: the camera focus level, the distance between the camera 009 and the droplet vessel 130, and/or any other measurement system feature. In a second embodiment, operation parameters of the system 100 (e.g., light source brightness, pose, etc.) can be adjusted based on an image of the fiducial (e.g., to achieve the target parameters).

Figure 22:
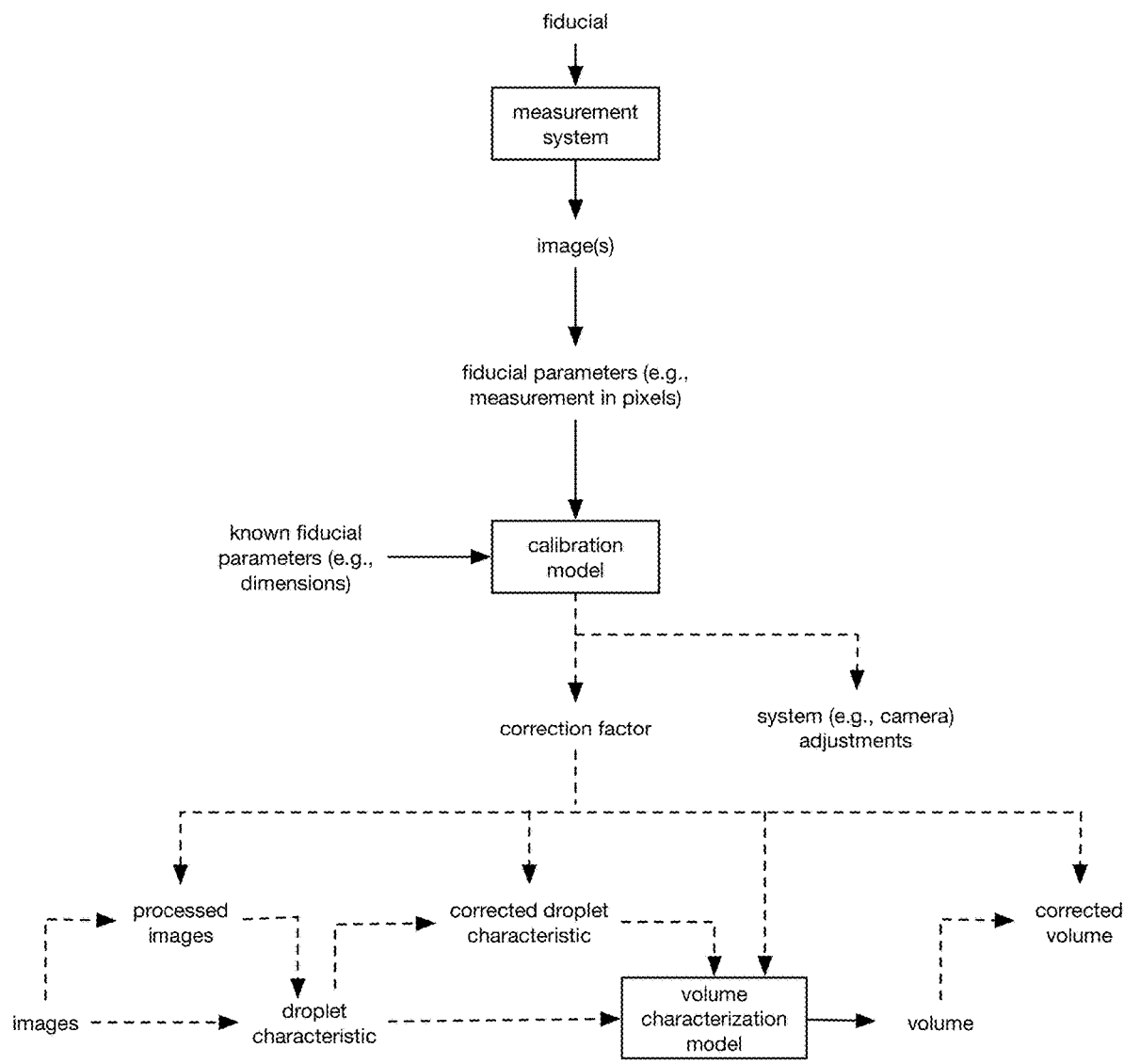
FIG. 22 depicts an example of calibration using a fiducial.

In a third embodiment, images sampled by the measurement system 150 can be processed using a calibration model (e.g., to map known dimensions of the fiducial to pixel measurements of the fiducial in the image; to correct for differences between dimensions of the fiducial in the sampled images and the known parameters, etc.). In an illustrative example, the calibration model can correct for differences in scale between calibration data (e.g., training data including images of the fiducial and known parameters of the fiducial) and the sampled images, such that pixels in the sampled images can be accurately converted to a unit of measurement (e.g., mm). In a first example, sampled images are processed (e.g., scaled up or down) using the calibration model, wherein the processed images are used in all or parts of the method. In a second example, the volume characterization model includes the calibration model, wherein the volume characterization model uses the calibration data to (internally) correct the determined volume for scale. In a third example, the calibration model (separate from the volume characterization model) determines a scaling factor based on the sampled images and applies the scaling factor to the droplet characteristic and/or to the volume outputted by the volume characterization model. An example is shown in FIG. 22.

However, the droplet analysis system can be otherwise configured.

The system 100 can optionally include a database (e.g., local database, remote database such as a cloud database, etc.), wherein the database can include known associations between: individual liquids (e.g., an identifier for a liquid), liquid classes, liquid characteristics, volumes, droplet formation timing (e.g., image selection information), liquid handling parameters, liquid handler specifications, a liquid handler identifier (e.g., specific to an individual liquid handler), the droplet model, the volume characterization model, and/or any other information.

Figure 14:
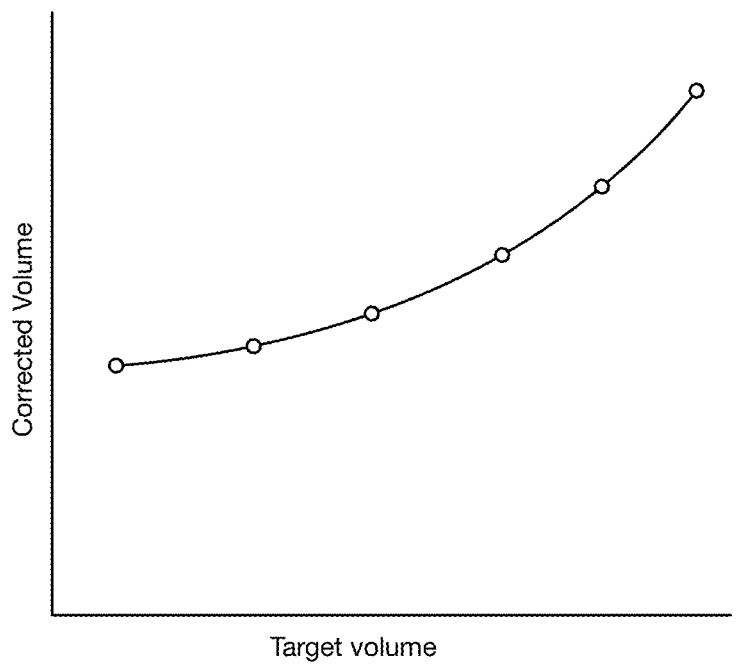
FIG. 14 depicts an illustrative example of a calibration curve.

In a first embodiment, a previous iteration of all or parts of the method can be used to determine the actual droplet volume dispensed when using a set of liquid handling parameters (e.g., given the droplet liquid characteristics, continuum media characteristics, etc.). This data can then be stored in the database to improve the initial liquid handling parameters for a subsequent iteration of all or parts of the method. In a specific example, the database can include one or more calibration curves, wherein each calibration curve relates target volumes to corrected (e.g., calibrated) aspiration volumes and/or dispensing volumes; an example is shown in FIG. 14. The calibration curve can be linear, nonlinear, interpolated, and/or otherwise configured. In an illustrative example, a calibration curve can map a target dispense volume of 1 μL to a corrected dispense volume of 1.2 μL (e.g., which will result in a 1 μL dispense). Each calibration curve can optionally be associated with (e.g., specific to) one or more of: liquid handler specifications, a sample and/or associated information (e.g., a liquid identifier for the sample, liquid characteristics for the sample, liquid class for the sample, etc.), and/or any other information.

In a second embodiment, the database can store an association between a liquid characteristic (e.g., viscosity) for a droplet liquid, a liquid characteristic for a continuum media, and droplet formation timing (e.g., which frames in a video are useful for droplet segmentation) which can be used to increase computational speed (e.g., fewer images are analyzed for selection) and/or otherwise optimize the method.

In a third embodiment, the database can be used to estimate information for a new droplet liquid (e.g., estimate: droplet liquid viscosity and/or other liquid characteristics, liquid handling parameters, optimal continuum media viscosity and/or other liquid characteristics, droplet formation timing, etc.). In a first embodiment example, the database can include associations between droplet volumes and liquid handling parameters for each of a set of individual liquids (e.g., referenced using a liquid identifier) and/or liquid classes, wherein each liquid and/or liquid class is optionally associated with corresponding liquid characteristics. In a second embodiment, the database can include associations between liquid handling parameters (e.g., liquid handling techniques) and individual liquids and/or liquid classes, wherein each liquid and/or liquid class is optionally associated with corresponding liquid characteristics. In a first example, the droplet liquid can be categorized into a liquid class (e.g., based on a known or estimated similarity between the liquid characteristics of the droplet liquid and the liquid characteristics of the liquid class), and liquid handling parameters can be selected from the database (e.g., for a first iteration of S100) that correspond to the liquid class. In a second example, the droplet liquid can be approximated as another liquid referenced in the database (e.g., based on a known or estimated similarity between the liquid characteristics of the droplet liquid and the liquid characteristics of the other liquid), and liquid handling parameters can be selected from the database that correspond to the other liquid. In a third example, the liquid handling parameters can be calculated (e.g., using a model) based on multiple sets of liquid handling parameters stored in the database in association with multiple liquids and/or liquid classes. In a first specific example, the new droplet liquid may be a mixture of two known liquids contained in the database, wherein information associated with the two known liquids can then be used to estimate corresponding information for the new liquid. In a second specific example, the new droplet liquid may have a viscosity between viscosities of two known liquids contained in the database, wherein information associated with the two known liquids can then be used to estimate corresponding information for the new liquid. In specific examples, combining liquid handling parameters from multiple liquids to determine liquid handling parameters for the droplet liquid can include: averaging, using a weighted average (e.g., based on the respective viscosities and/or other liquid characteristics of the first and second liquids), aggregating using a linear and/or nonlinear equation, and/or otherwise combining the parameters using a traditional model or a machine learning model.

However, the database can be otherwise configured.

Figure 21:
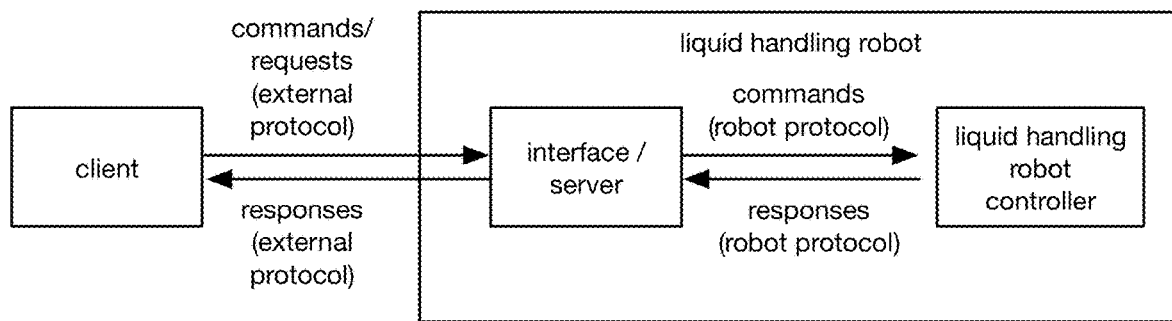
FIG. 21 depicts an example of interfacing with a liquid handling robot.

The system 100 can optionally include a computing system (e.g., a processor), which can include one or more: CPUs, GPUs, custom FPGA/ASICS, microprocessors, servers, cloud computing, and/or any other suitable components. The computing system can be local, remote, distributed, or otherwise arranged relative to any other system or module. In a first example, the computing system includes a robot processing system. In a second example, the computing system includes a separate processing system communicatively connected to the robot processing system (e.g., colocalized or remote from the robot). For example, the computing system (e.g., functioning as a client) can transmit software commands to the laboratory robot system (e.g., batched, streaming, etc.). In a specific example, external protocol commands are transmitted to an interface of the laboratory robot system, which then translates the external protocol commands to robot protocol commands which directly control the liquid handling robot operation. An example is shown in FIG. 21. However, the computing system can be otherwise configured.

The system 100 can include one or more models, including a droplet model, volume characterization model, image selector, segmentation model, and/or any other model. The models can include classical or traditional approaches, machine learning approaches, and/or be otherwise configured. The models can include regression (e.g., linear regression, non-linear regression, logistic regression, ordinary least squares, stepwise regression, multivariate adaptive regression splines, locally estimated scatterplot smoothing, etc.), decision tree, LSA, clustering, association rules, dimensionality reduction (e.g., PCA, t-SNE, LDA, etc.), neural networks (e.g., CNN, DNN, CAN, LSTM, RNN, FNN, encoders, decoders, deep learning models, transformers, etc.), ensemble methods, optimization methods (e.g., Bayesian optimization), rules, heuristics, equations (e.g., weighted equations, etc.), selection (e.g., from a library), regularization methods (e.g., ridge regression), Bayesian methods (e.g., Naiive Bayes, Markov), instance-based methods (e.g., nearest neighbor), kernel methods, support vectors (e.g., SVM, SVC, etc.), statistical methods (e.g., probability), comparison methods (e.g., matching, distance metrics, thresholds, etc.), deterministics, genetic programs, classification (e.g., binary classifiers, multiclass classifiers, etc.), segmentation models, object detectors, object trackers, computer vision models, and/or any other suitable model. The models can include (e.g., be constructed using) a set of input layers, output layers, and hidden layers (e.g., connected in series, such as in a feed forward network; connected with a feedback loop between the output and the input, such as in a recurrent neural network; etc.; wherein the layer weights and/or connections can be learned through training); a set of connected convolution layers (e.g., in a CNN); a set of self-attention layers; and/or have any other suitable architecture.

Models can be trained, learned, fit, predetermined, and/or can be otherwise determined. The models can be trained or learned using: supervised learning, unsupervised learning, self-supervised learning, semi-supervised learning (e.g., positive-unlabeled learning), reinforcement learning, transfer learning, Bayesian optimization, fitting, interpolation and/or approximation (e.g., using gaussian processes), backpropagation, and/or otherwise generated. The models can be learned or trained on: labeled data (e.g., data labeled with the target label), unlabeled data, positive training sets (e.g., a set of data with true positive labels), negative training sets (e.g., a set of data with true negative labels), and/or any other suitable set of data.

However, the system 100 can be otherwise configured.

5. METHOD

As shown in FIG. 1, the method can include: dispensing a droplet using a liquid handler S100, sampling a set of measurements of the droplet S200, and determining the droplet volume based on the set of measurements S300. The method can optionally include adjusting liquid handling parameters based on the droplet volume S400, determining a volume characterization model S600, and/or any other suitable steps.

All or portions of the method can be performed by one or more components of the system 100, using a computing system, using a database (e.g., a system database, a third-party database, etc.), by a user, and/or by any other suitable system. All or portions of the method can be performed: in real time (e.g., responsive to a request), before an experiment, during an experiment (e.g., at predetermined intervals, when a dispensing inaccuracy is detected, etc.), after an experiment, in between experiments, before using an uncalibrated liquid handler, after a hiatus from using a liquid handler, before using a liquid handler to pipette a new (e.g., uncharacterized) liquid, and/or at any other suitable time. All or portions of the method can be performed iteratively, concurrently, asynchronously, periodically, and/or at any other suitable time. All or portions of the method can be performed automatically, manually, semi-automatically, and/or otherwise performed.

Dispensing a droplet using a liquid hander S100 functions to form a droplet in a continuum media. The liquid handler 110 is preferably not calibrated (e.g., not known to dispense accurate droplet volumes), but can alternatively be calibrated.

The droplet is preferably dispensed using the liquid handler 110 (e.g., from a pipette tip of the liquid handler 110), but can alternatively be otherwise formed. The liquid handler 110 can dispense the droplet based on: an initial set of liquid handling parameters (e.g., dispensing parameters) and a target volume (e.g., desired volume, predicted volume, etc.). The target volume can be between 10 nL-100 µL or any range or value therebetween (e.g., 100 nL-20 µL, less than 10 µL, less than 100 µL, etc.), but can alternatively be less than 10 nL or greater than 100 µL. The target volume is preferably the target volume of an individual droplet, but can alternatively be an overall target volume (e.g., a total volume of an array of droplets). In an illustrative example, a 100 µL target overall volume is separated into an array of five droplets with a target droplet volume of 10 µL.

Figure 15A:
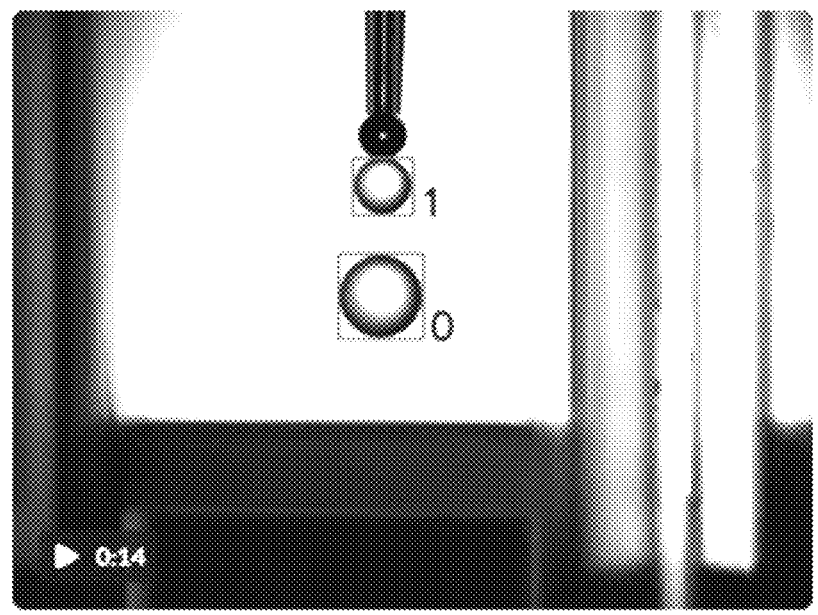
FIG. 15A depicts an illustrative example of a high viscosity liquid droplet (2.5 µl DMSO) dispensed in a continuum media (e.g., media immiscible with the liquid droplet). A trained classifier identifies the spheroid shapes of interest, separating those from all other spheroid shapes (current and residual) within the frames, and assigns bounding boxes and a droplet identifier number.
Figure 15B:
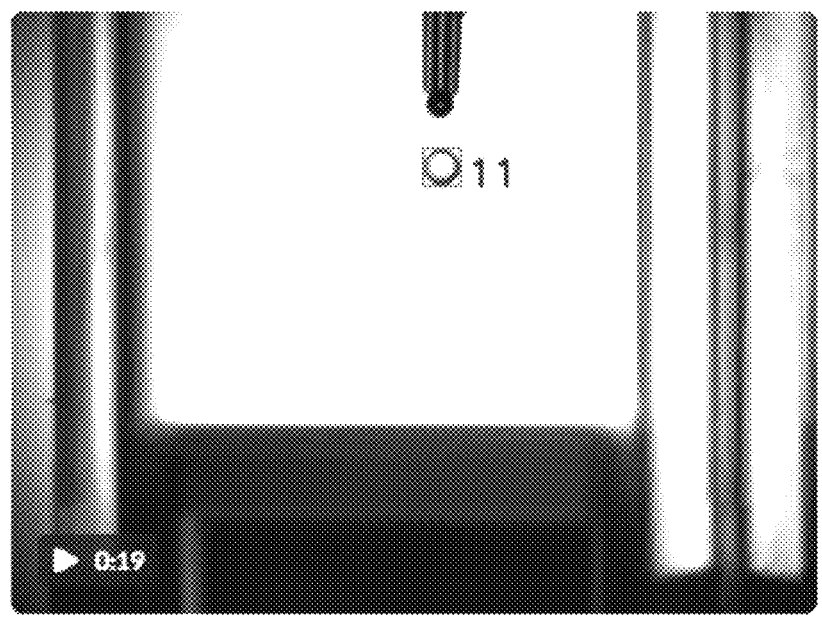
FIG. 15B depicts an illustrative example of a low surface tension liquid droplet (100 nl lysis buffer) dispensed in a continuum media.
Figure 16:
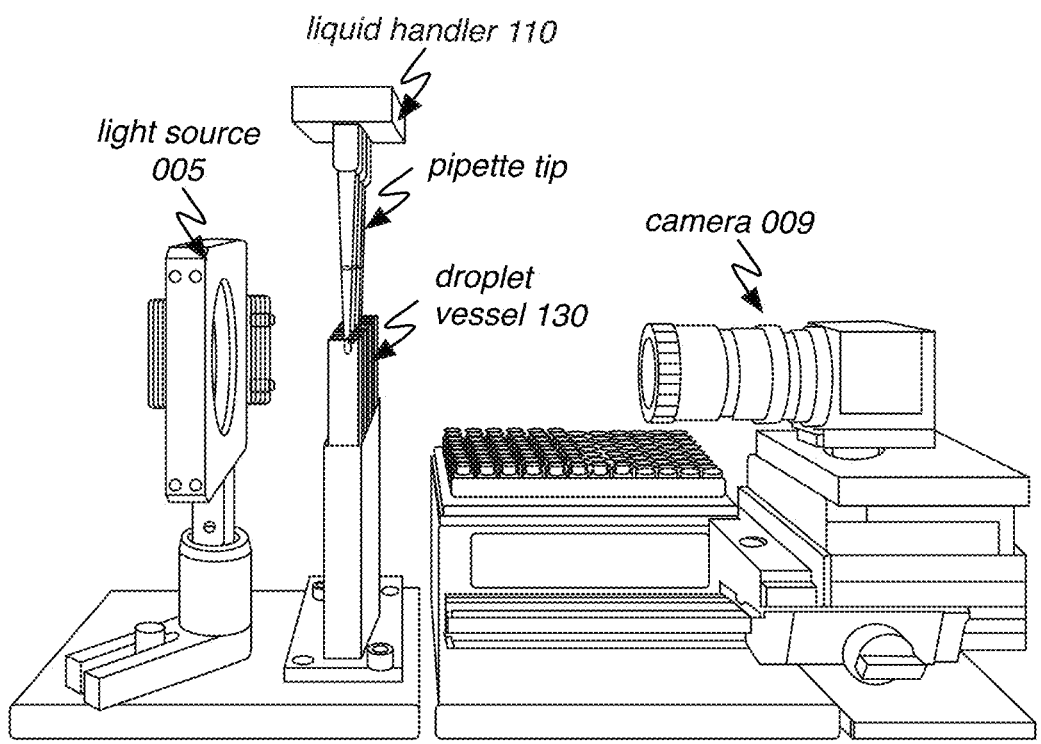
FIGS. 16, 17, and 18 depict examples of the droplet analysis system.
Figure 17:
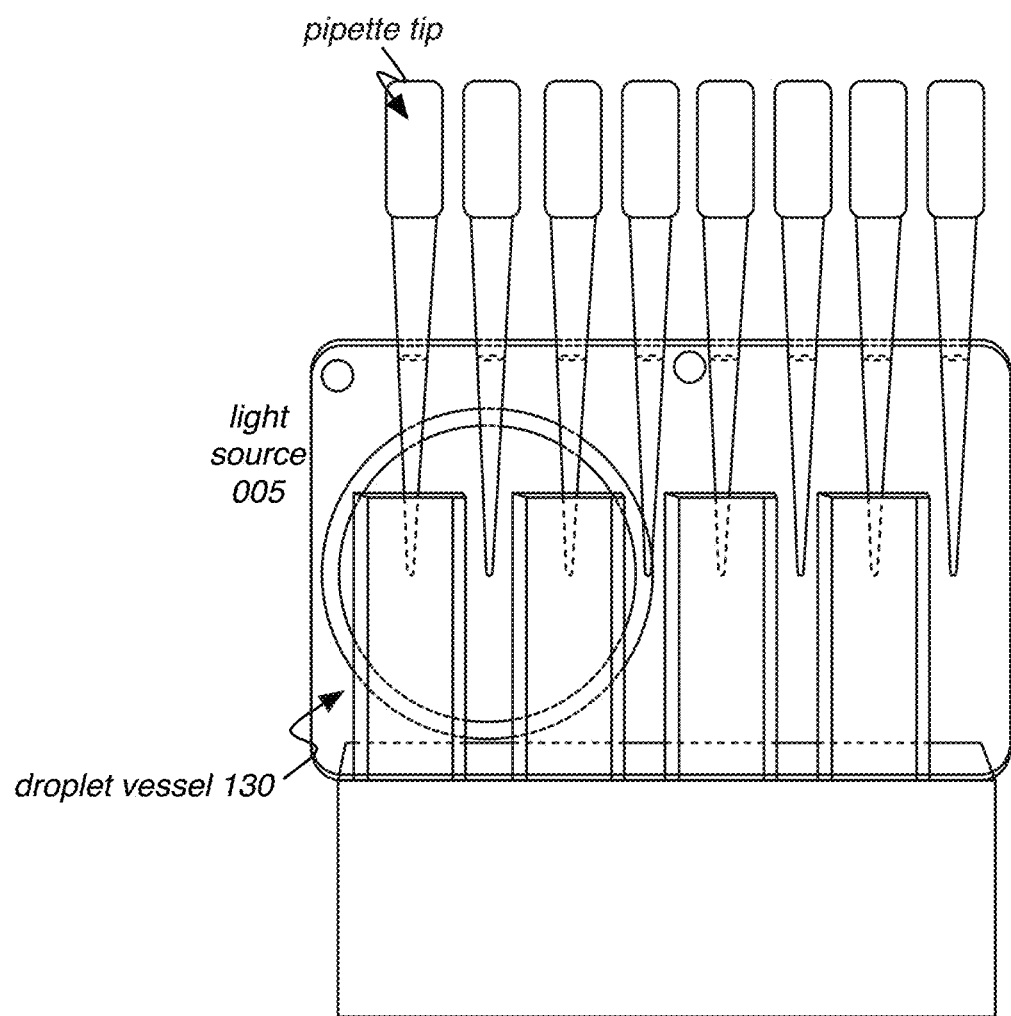

The droplet (e.g., a first sample) is dispensed into a continuum media (e.g., a second sample) within the droplet vessel 130. Examples are shown in FIG. 15A and FIG. 15B. In an example, dispensing the droplet can include controlling the liquid handler 110 to: move the pipette tip to a sample container for the droplet liquid, aspirate a target aspiration volume of the droplet liquid based on a set of aspiration parameters, move the pipette tip to the droplet vessel 130 containing continuum media, lower the pipette tip such that the pipette tip is below the surface of the continuum media, and dispense one or more droplets of the droplet liquid into the continuum media based on a set of dispensing parameters and a target dispensing volume.

The droplet liquid can include an aqueous solution, non-aqueous solution, detergent, mixture of an aqueous solution and a detergent, organic liquid (e.g., involatile organic solvents), inorganic liquid (e.g., inorganic solvent), surfactant (e.g., Lysis Buffer containing SDS), and/or any other fluid. The droplet liquid can optionally include multiple fluids (e.g., wherein the droplet liquid includes a first fluid encapsulated in a second fluid; wherein the droplet liquid includes a mixture; etc.). The droplet liquid can be viscous (e.g., DMSO, Glycerol, Ethyl Glycol) or non-viscous (e.g., water, phosphate-buffered saline, etc.). The viscosity of the droplet liquid can be between 1-10,000 cSt or any range or value therebetween (e.g., 1-1000 cSt), but can alternatively be less than 1 cSt or greater than 10,000 cSt. The droplet liquid can be predetermined, selected by a user, selected based on a protocol specification, and/or otherwise selected. The protocol specification can include liquid types (e.g., types of reagents that will be used in an experiment), volumes, continuum media types, and/or any other experiment information.

The continuum media preferably includes oil (e.g., silicon oil), but can alternatively include any other fluid (e.g., organic or inorganic liquid, air or other gas, etc.). The continuum media can optionally include multiple fluids (e.g., wherein the droplet is encapsulated in a first continuum media before or while the droplet is dispensed in a second continuum media). The continuum media can be static or moving (e.g., flowing) while the droplet is dispensed. In a first specific example, the continuum media can be a static reservoir. In a second specific example, the continuum media can be a sheath flow. The droplet liquid is preferably immiscible in the continuum media, but can alternatively be miscible. The continuum media can be: transparent, translucent, dyed, have a different optical characteristic from the droplet liquid, and/or have any other suitable set of optical characteristics. The viscosity of the continuum media is preferably known, but can alternatively be a relative viscosity (e.g., relative to air, relative to the viscosity of the droplet liquid, etc.), estimated (e.g., based on measurements from the measurement system and/or a separate system), or unknown. The viscosity of the continuum media can be between 1-10,000 cSt or any range or value therebetween (e.g., 5-1000 cSt), but can alternatively be less than 1 cSt or greater than 10,000 cSt. Preferably, there is a known viscosity relationship between the continuum media and the droplet liquid, but alternatively the viscosity relationship can be unknown. The continuum media can be predetermined, selected by a user, selected based on based on a liquid characteristic (e.g., viscosity) of the droplet liquid, selected based on a protocol specification, selected using the database, selected using a set of heuristics, and/or otherwise selected. In an example, the continuum media can be selected based on a known or estimated liquid characteristic of the droplet liquid. The continuum media is preferably selected to have a greater viscosity than the droplet liquid, but can alternatively be selected to have a lower viscosity than the droplet liquid and/or be otherwise determined. The viscosity differential between the continuum media and the droplet liquid can be between 0 cSt-20000 cST (e.g., at least 1 cSt, at least 10 cSt, at least 100 cSt, at least 1000 cSt, at least 5000 cSt, at least 10000 cSt, etc).

Figure 10:
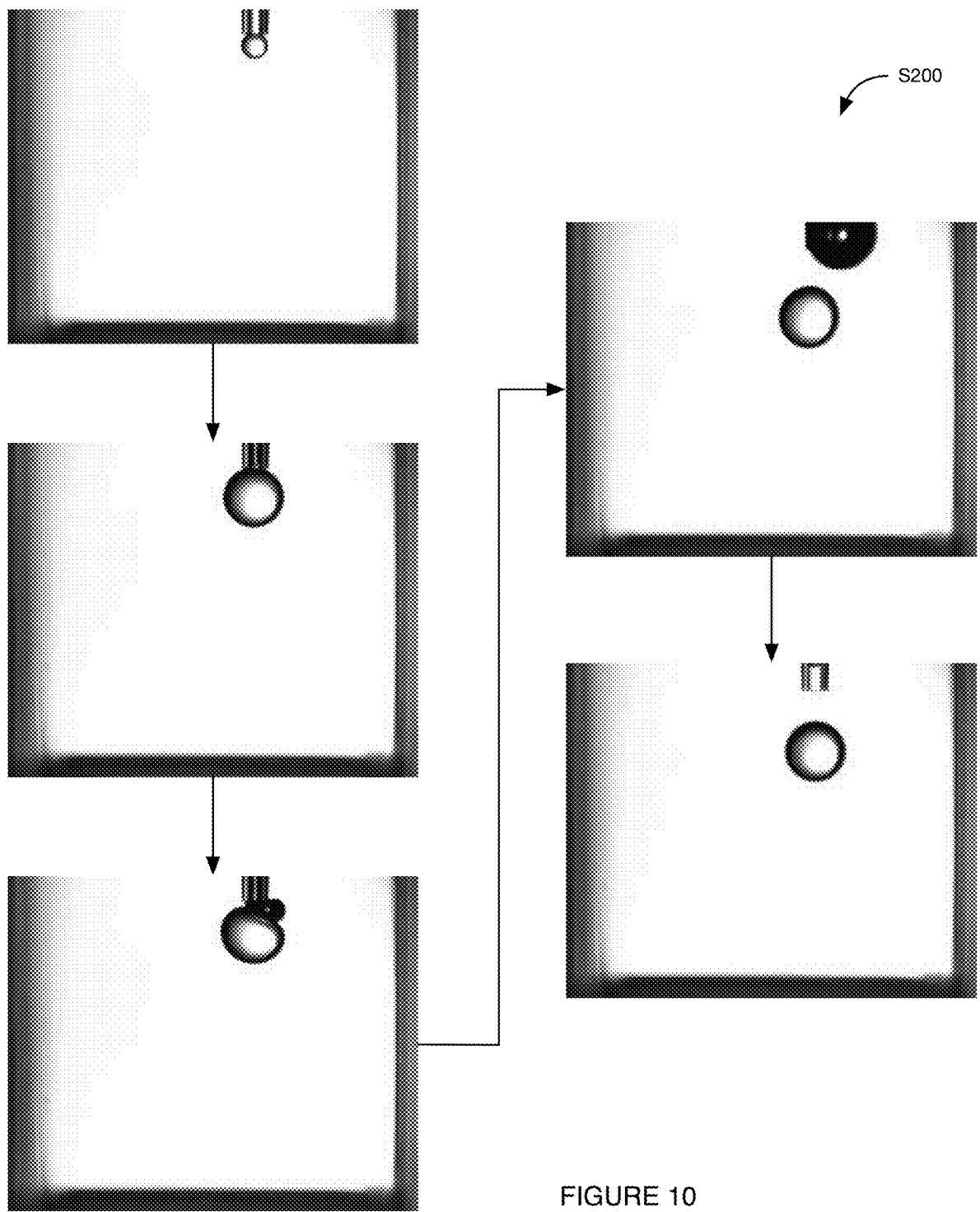
FIG. 10 depicts an illustrative example of a set of images sampled while dispensing a droplet.
Figure 11:
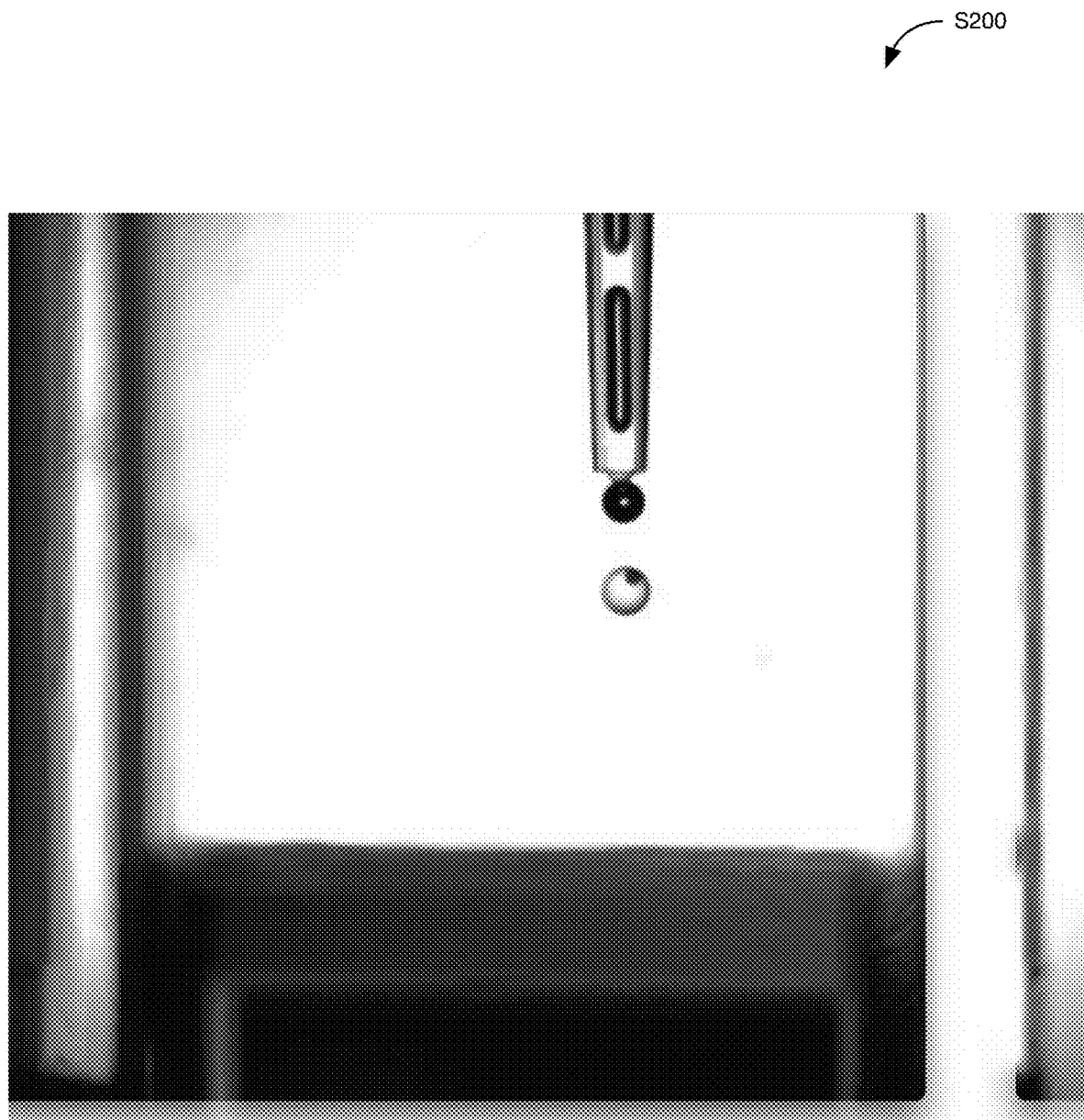
FIG. 11 depicts an illustrative example of an image sampled while dispensing a droplet array, with droplets in the droplet array separated by an air bubble.

The droplet is preferably completely dispensed from the pipette tip, but can alternatively be partially dispensed (e.g., a pendant drop suspended from the pipette tip) or not dispensed from the pipette tip. An air bubble can optionally follow the droplet in the pipette tip (e.g., to release the droplet from the pipette tip); an example is shown in FIG. 10. In another example, a droplet can be dislodged using mechanical methods (e.g., shaking the pipette tip, vibrating the pipette tip, tapping the pipette tip, etc.). The droplet can optionally be a droplet within an array of droplets (e.g., to dispense a large target volume). In an example, air bubbles can be positioned (e.g., intermittently inserted) between droplets to define the individual droplets in the array (e.g., wherein the air bubbles are present at a predetermined frequency); an example is shown in FIG. 11. Additionally or alternatively, droplet formation can be controlled using: dispensation pressure regulation, valve open/close control, any other liquid handling parameters, and/or otherwise controlled.

However, the droplet can be otherwise formed.

Sampling a set of measurements of the droplet S200 functions to acquire an image of a silhouette of the droplet. S200 can be performed after S100 (e.g., after the droplet has separated from the pipette tip), during S100 (e.g., while dispensing the droplet), and/or at any other time. The set of measurements preferably includes a set of images (e.g., a video), but can additionally or alternatively include other measurements (e.g., acoustic measurements, ultrasound measurements, etc.). The set of measurements can be sampled using the measurement system 150 and/or any other suitable system. The set of measurements can optionally be provided to a user (e.g., displayed in real time). In an example, the set of measurements can be one or more images of the droplet sampled while dispensing the droplet and/or after dispensing the droplet. In specific examples, the video can begin when the liquid handler 110 starts dispensing (at the start of S100), after an interval relative to the start of dispensing the droplet, and/or at any other time. The images preferably include a contrast between the edge of the droplet and the background (e.g., a silhouette of the droplet), but can alternatively otherwise depict the droplet. Images can be 2D, 3D, and/or any other dimension. The images can be RGB, black and white, grayscale, infrared, and/or any other wavelength. However, the set of measurements can be otherwise determined.

Determining the droplet volume based on the set of measurements S300 functions to estimate the actual (dispensed) droplet volume. S300 can be performed after S200 and/or at any other time. All or portions of S300 can be performed at the computing system. S300 can be performed for a single droplet and/or for each of a set of liquid droplets, wherein a total dispensed volume can be determined by summing the individual volumes for each droplet. All or portions of S300 can be performed using one or more models, wherein the models can be generic or specific relative to: droplet liquids, continuum media, liquid handlers, and/or any other component.

S300 preferably includes using a droplet model and/or a volume characterization model, but can alternatively use any other model(s).

The droplet model can function to identify the droplet of interest in an image (e.g., pixels in the image corresponding to the droplet of interest, a bounding box corresponding to the droplet of interest, a label for the bounding box, a pixel location, etc.). The input to the droplet model can include one or more images in the set of images, and/or any other suitable inputs. The output from the droplet model can include, for one or more droplets and/or other objects in an image: a droplet classification or droplet segment (e.g., a label for pixels in the image, a label for a bounding box, etc.), a confidence score for the droplet classification, a bounding box (e.g., pixel perfect bounding box) for the droplet, a droplet identifier (e.g., for tracking the droplet), geometric characteristics for the droplet, a location for the droplet, and/or any other droplet features. The droplet bounding box can include bounding box parameters, wherein the bounding box parameters can include a bounding box location (e.g., pixel location), bounding box geometric characteristic (e.g., size, dimensions, etc.), and/or any other parameters. The droplet classification can include: air or liquid; lingering droplet or moving droplet; a droplet of interest or a droplet that is not of interest; and/or any other classification. In a specific example, moving liquid droplets are classified as droplets of interest, while other objects (e.g., air bubbles, lingering liquid droplets, previously detected droplets, etc.) are not classified as droplets of interest. In an illustrative example, if a lingering droplet eventually falls it is then classified as a droplet of interest (and thus counted towards the total volume), but if it does not fall it is not classified as a droplet of interest (and thus does not count towards the total volume). The confidence score can be a probability that the droplet is correctly classified, a probability that the droplet is a droplet of interest, and/or any other confidence score. In a specific example, the confidence score for a detected droplet in a single frame can be based on multiple frames (e.g., based on droplet motion across multiple frames).

Figure 5:
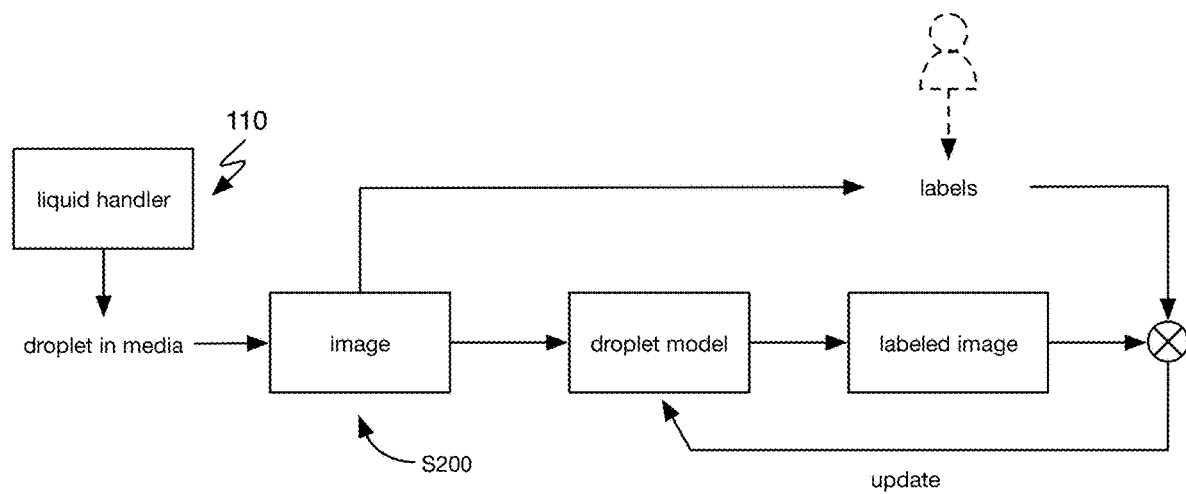
FIG. 5 depicts an example of training a droplet model.

The droplet model can be trained before S100 (e.g., prior to inference) and/or at any other time. The droplet model can be trained on a set of labeled images (e.g., images sampled via S200 methods). Optionally, the set of images can be images sampled of droplets with a variety of liquid types (e.g., liquid classes important for liquid handling, a variety of viscosities, a variety of colors, etc.), a variety of droplet sizes, and/or a variety of continuum media types (e.g., varying viscosities, varying viscosity relative to the viscosity of the droplet liquid, etc.). An example is shown in FIG. 5.

Figure 12:
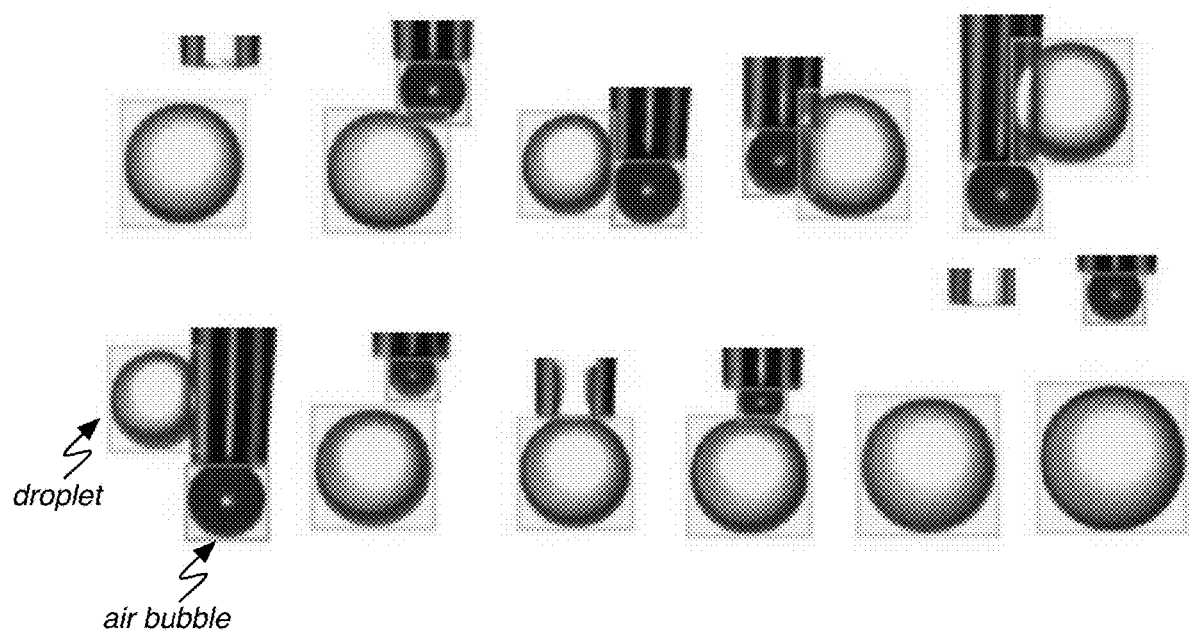
FIG. 12 depicts illustrative examples of a binary droplet classifier labeling droplets and air bubbles in images.

The droplet model can be or include: a classifier, a segmentation algorithm (e.g., a segmentation model, instance-based segmentation model, etc.), an object detector, a shape fitting model, an edge detector, and/or any other image processing method. In specific examples, the droplet model can be or include a YOLO model, a SSD model, and/or any other object detection and/or classification models. In an example, the droplet model distinguishes the droplet of interest from: air bubbles, other droplets (e.g., previously dispensed droplets, droplets stuck in the pipette, etc.), and/or other objects in the image (e.g., noise). In a specific example, droplets and/or other objects can be labeled in successive frames of a video (e.g., tracking their position) to aid in distinguishing previously dispensed droplets (e.g., noise) from the (new) droplet of interest. In variants, the droplet model can be a classifier, wherein the classifier can be a binary classifier (e.g., labeling objects as air bubbles or droplets), a multiclass classifier (labeling objects as air bubbles, droplets of interest, previous droplets, etc.), multiple classifiers (e.g., an air bubble classifier and a liquid droplet classifier), and/or any other classifier. An example is shown in FIG. 12.

The droplet model can optionally classify (e.g., score, select, etc.) images. For example, the droplet model can function as an image selector, wherein a classifier can select one or more frames where the droplet of interest is not touching other objects and/or based on any other image selection criteria.

However, droplet model can be otherwise configured.

Figure 7:
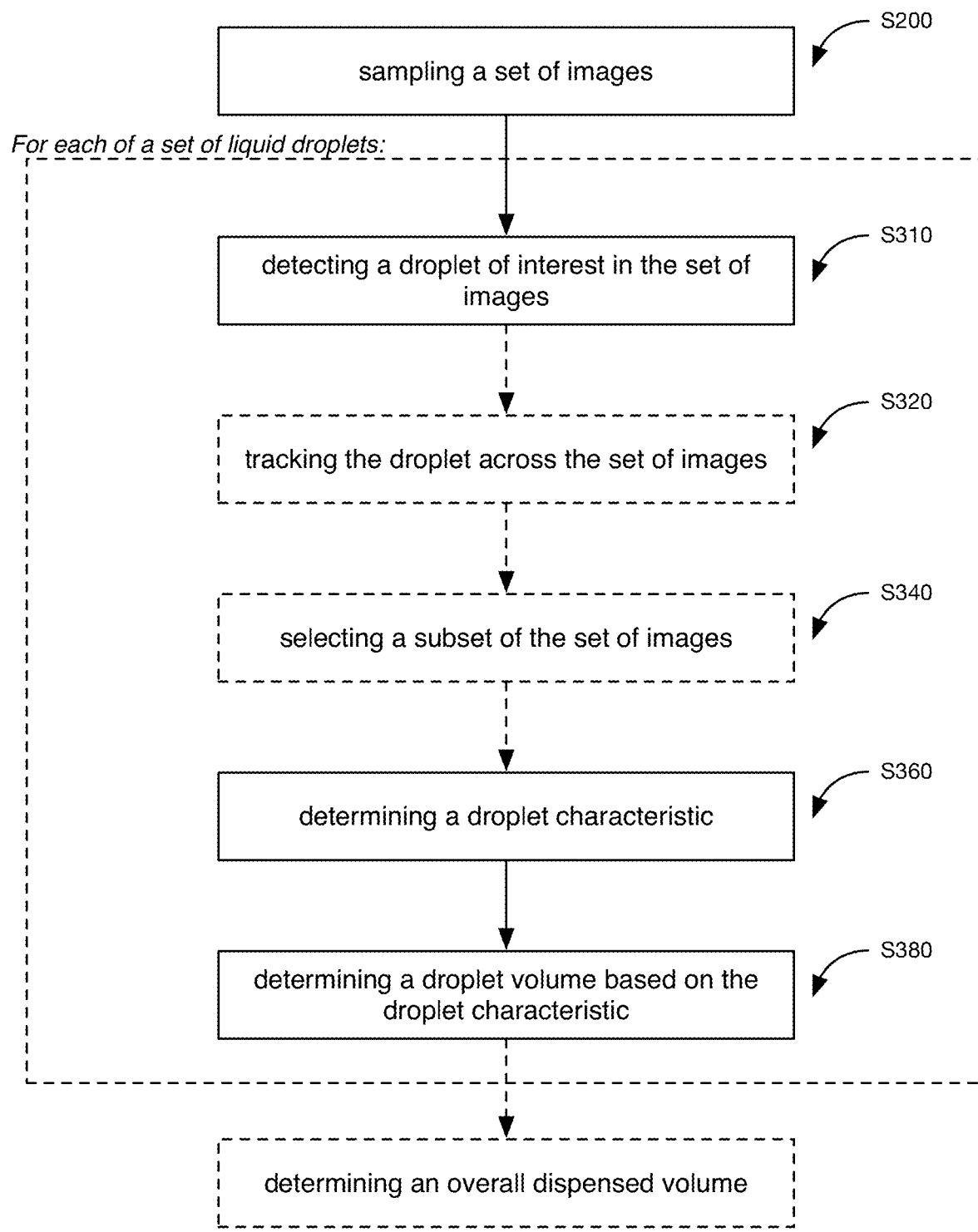
FIG. 7 is a schematic representation of a specific example of the method, including determining a droplet volume based on a subset of images.

S300 can include: detecting a droplet of interest in a set of images S310; optionally tracking the droplet across the set of images 320; optionally selecting a subset of the set of images S340; determining a droplet characteristic 360 (e.g., based on the subset of images); and determining a droplet volume based on the droplet characteristic S380. An example is shown in FIG. 7.

Detecting a droplet of interest in a set of images S310 can include using the droplet model to distinguish a liquid droplet of interest from other liquid droplets and air bubbles. In a first example, a first droplet model can detect each droplet in an image, and a second droplet model can output a classification for the droplet and optionally a confidence score for the droplet classification. In a second example, a single droplet model can detect each droplet in an image and output, for each droplet: a droplet classification, an optional confidence score for the droplet classification, and/or any other suitable outputs. In an example, detecting the droplet of interest can optionally include confirming that the droplet confidence score is above a threshold (e.g., greater than 50%, 60%, 70%, 80%, 90%, etc.). However, the droplet of interest can be otherwise detected.

Tracking the droplet across the set of images 320 can be performed after S310, during S310 (e.g., wherein the droplet track is used to determine the confidence score), and/or at any other time. In an example, the droplet of interest is tracked after confirming the droplet is a droplet of interest. Tracking the droplet can include tracking the bounding box for the droplet across the set of images. For example, the droplet track (e.g., associated with a droplet identifier) can include the droplet bounding box location and/or the droplet bounding box geometric characteristic (e.g., size) for each of the set of images. Additionally or alternatively, a location associated with the droplet and/or a geometric characteristic associated with the droplet can be tracked without a bounding box (e.g., tracking the droplet center point, tracking a segmented droplet, etc.). However, the droplet can be otherwise tracked.

Selecting a subset of the set of images S340 can be performed prior to S310 (e.g., one or more frames are selected, and the droplet of interest is detected in the selected frames), after S310, after S320, and/or at any other time. The image selector can select the image in real or near-real time, asynchronously from droplet formation, and/or at any other time. The subset of images can be a single image or multiple images.

Selecting a subset of images can include using an image selector. The image selector can be a set of rules, heuristics, a classifier, a neural network, an attention model or set of attention layers, and/or any other model. The image(s) can be selected independent of the image content (e.g., independent of whether a droplet of interest is detected in the scene) and/or selected based on the image content. The image(s) can be selected based on a time and/or frame number associated with the image, droplet location (e.g., within the container, relative to other objects, etc.), droplet relationship (e.g., interaction) with other objects (e.g., pipette tip, air bubbles, other droplets, etc.), a geometric characteristic associated with the droplet (e.g., droplet shape such as roundness, droplet size, a change in droplet size, etc.), the droplet track, droplet edge detection confidence (e.g., a focus level of the droplet edge, droplet motion, etc.), droplet formation/progression timing, and/or any other information.

Figure 8:
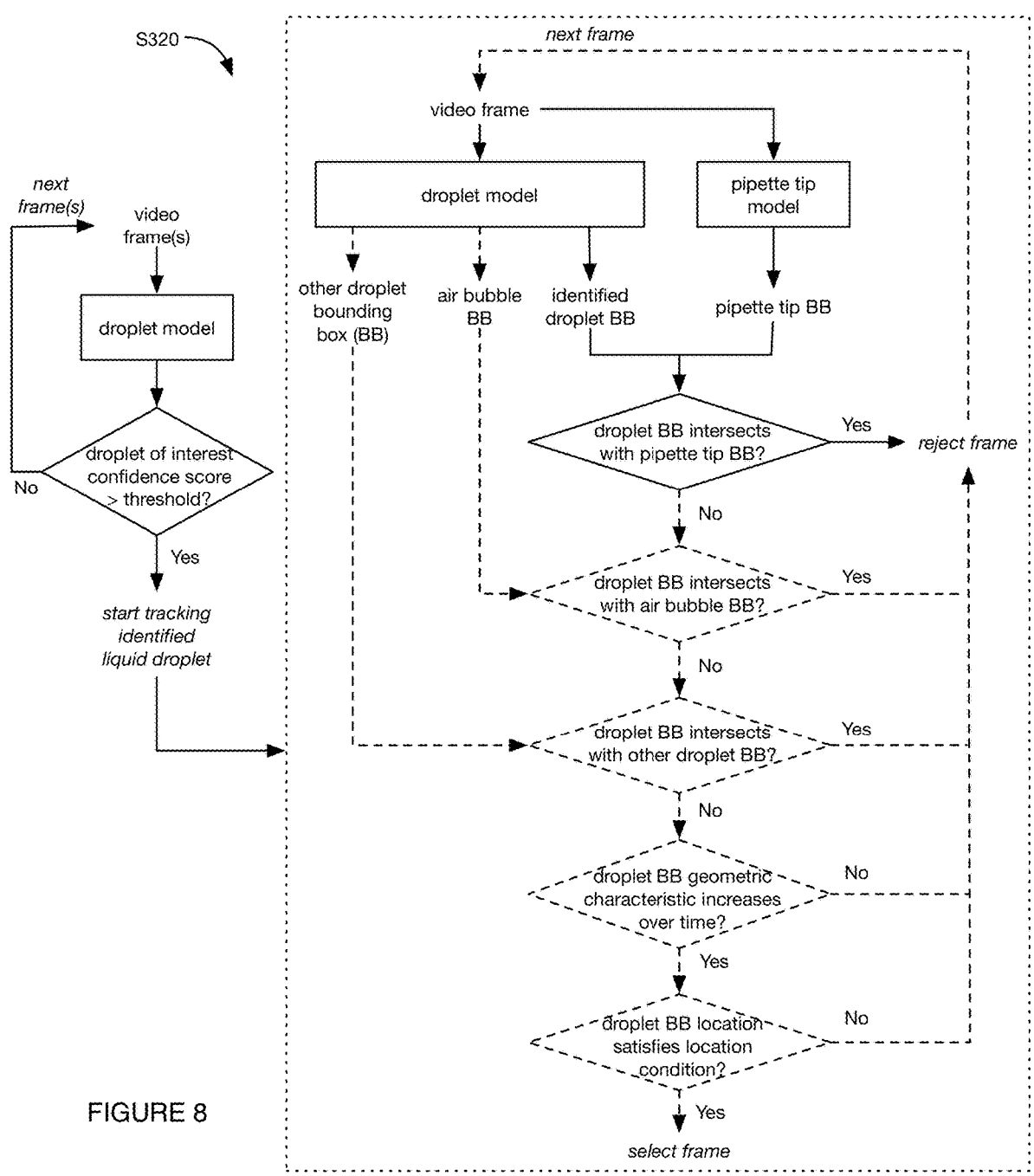
FIG. 8 depicts a specific example of selecting images.
Figures 9A, 9B:
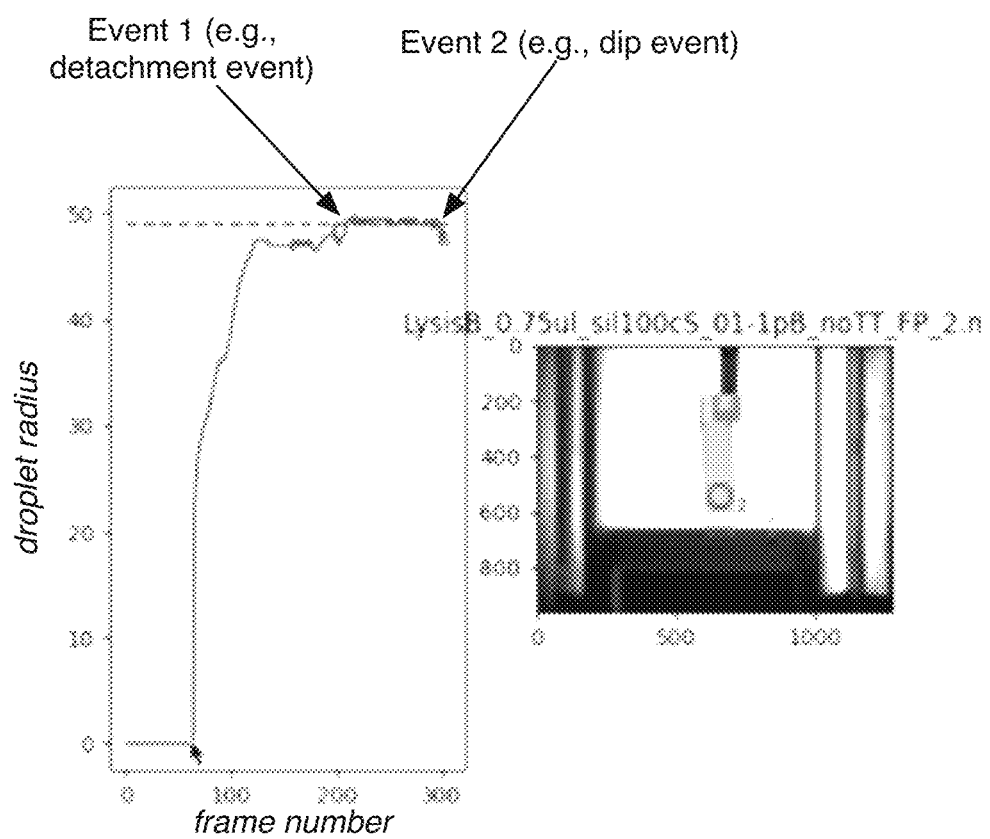
FIG. 9A depicts an illustrative example of a plot of droplet radius versus frame number for a droplet dispensed in a continuum media (e.g., the droplet in FIG. 9B). A first event (e.g., detachment event) and a second event (e.g., dip event) are identified on the plot.
FIG. 9B depicts an illustrative example of a video frame of a droplet dispensed in a continuum media.
Figure 9C:
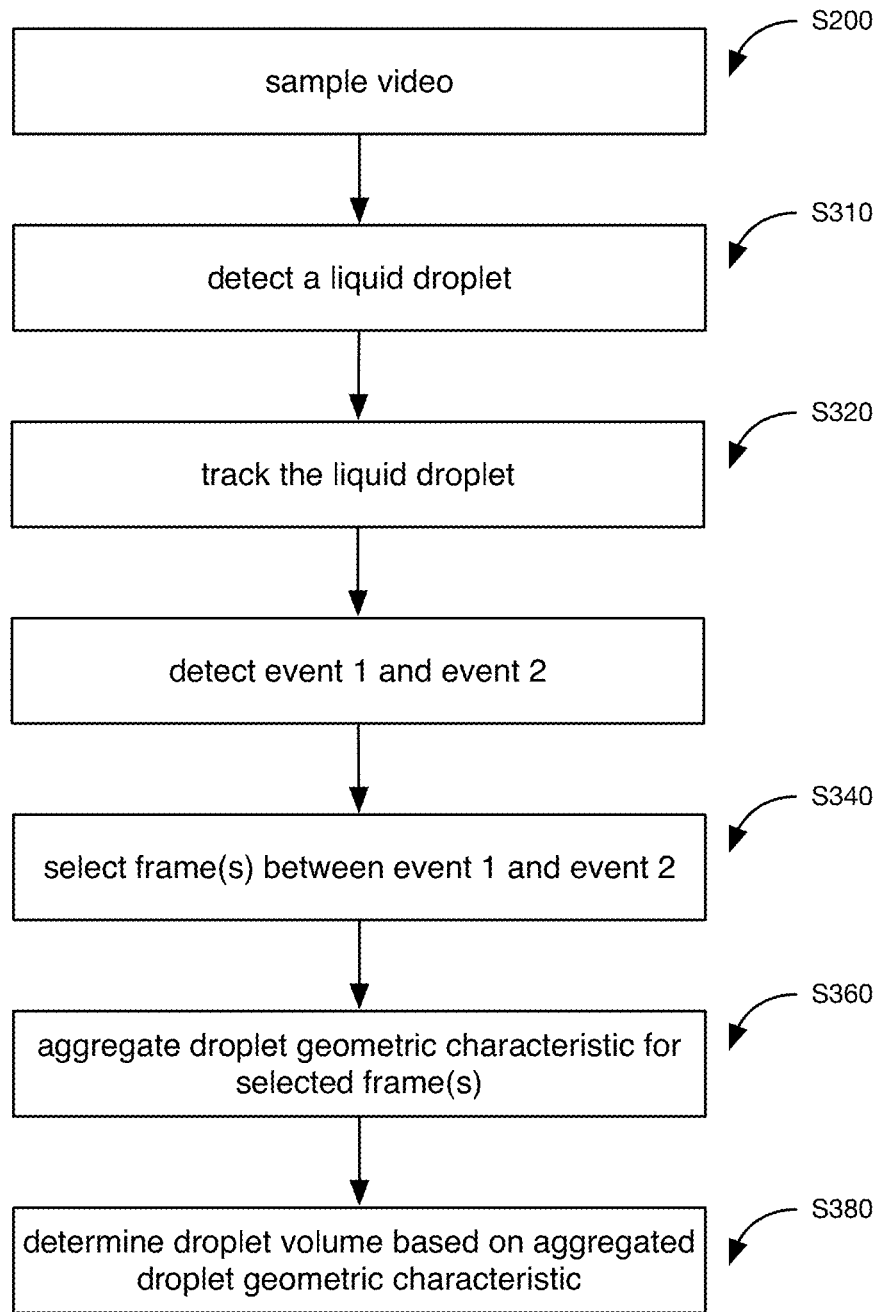
FIG. 9C is a schematic representation of a specific example of the method, including aggregating droplet characteristics across selected images between a first event and a second event.

In variants, the subset of images can be selected based on the image(s) satisfying one or more criteria. An example is shown in FIG. 8. In a first example, a criterion includes a time and/or frame number of the image satisfying a time window and/or frame number window associated with droplet formation/progression. In a specific example, only a subset of video frames are analyzed (e.g., for further image selection, for droplet volume determination, etc.) based on an estimated timing of droplet release from the pipette tip (e.g., relative to the start of dispensing the droplet, relative to the start of droplet release from the pipette tip, etc.). The image selector can optionally determine the timing/frame number criterion based on the liquid characteristics of the droplet and/or the continuum media and/or based on other information in the database. In a second example, a criterion includes the droplet not touching and/or not overlapping with one or more other objects. In a specific example, the criterion can include a bounding box for the droplet of interest does not intersect with bounding boxes for: the pipette tip (e.g., output using a pipette tip object detector and/or any other pipette tip model), air bubbles (e.g., output using the droplet model), other droplets (e.g., output using the droplet model), and/or any other objects. In an illustrative example, the image selector checks that the droplet has separated from the pipette tip. In a third example, a criterion includes the change in a geometric characteristic associated with the droplet is above a threshold. In a specific example, the geometric characteristic can be a size of the droplet (e.g., a segmented droplet) and/or of the droplet bounding box. In an illustrative example, the criterion includes checking that the droplet is growing while dispensing the droplet from the pipette tip to ensure the droplet is not a lingering droplet (e.g., a previously dispensed droplet). In a fourth example, a criterion includes the droplet location satisfying a location criterion (e.g., when the droplet location crosses a target y pixel value, when the droplet location is within a target y pixel value window, etc.). The droplet location can be a center point and/or edge of the droplet (e.g., a segmented droplet), center point and/or edge of the droplet bounding box, and/or any other location associated with the droplet. In a fifth example, a criterion includes the image being sampled after and/or before a detected event (e.g., between a first event and a second event). In a specific example, images after a detachment event (after the droplet has separated from the pipette tip) and/or before a dip event (the droplet has touched the base of the droplet vessel 130; the droplet has passed below the edge of a droplet viewing window; etc.) are selected. The detachment event can be determined based on a geometric characteristic associated with the droplet (e.g., the detachment event occurs when the droplet size stops increasing), based on whether the droplet is touching the pipette tip, and/or based on any other criteria. The dip event can be determined based on geometric characteristic associated with the droplet (e.g., the dip event occurs when the droplet size starts decreasing), based on the droplet location, and/or based on any other criteria. Examples are shown in FIG. 9A, FIG. 9B, and FIG. 9C.

The set of criteria can be used in serial, in parallel, and/or can be otherwise arranged. For example, the image selector can iterate through the video frames until a first set of criteria are satisfied (e.g., the droplet does not touch other objects and the droplet size is growing; after a detachment event; etc.), then continue iterating until a second set of criteria are satisfied (e.g., a droplet location criterion), wherein the image(s) in that satisfy the second set of criteria are selected.

However, the image can be otherwise selected.

Determining a droplet characteristic based on the subset of images S360 can optionally include segmenting the droplet of interest from the subset of images and determining a droplet characteristic (e.g., a 2D geometric characteristic of the droplet silhouette, a droplet area, a droplet pixel count, etc.) based on the segmented droplet.

Figure 6A:
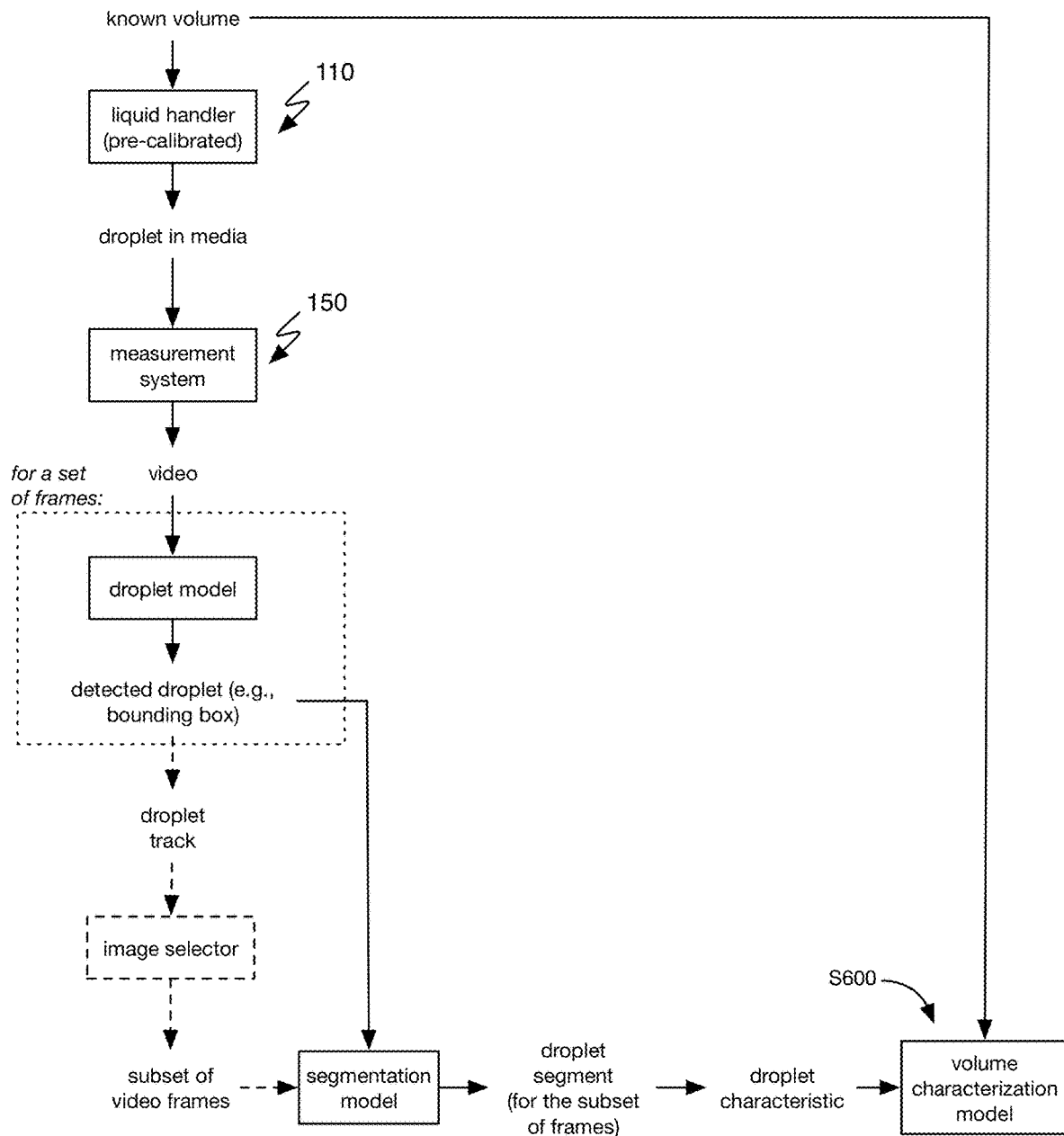
FIG. 6A depicts an example of determining a volume characterization model.
Figure 6B:
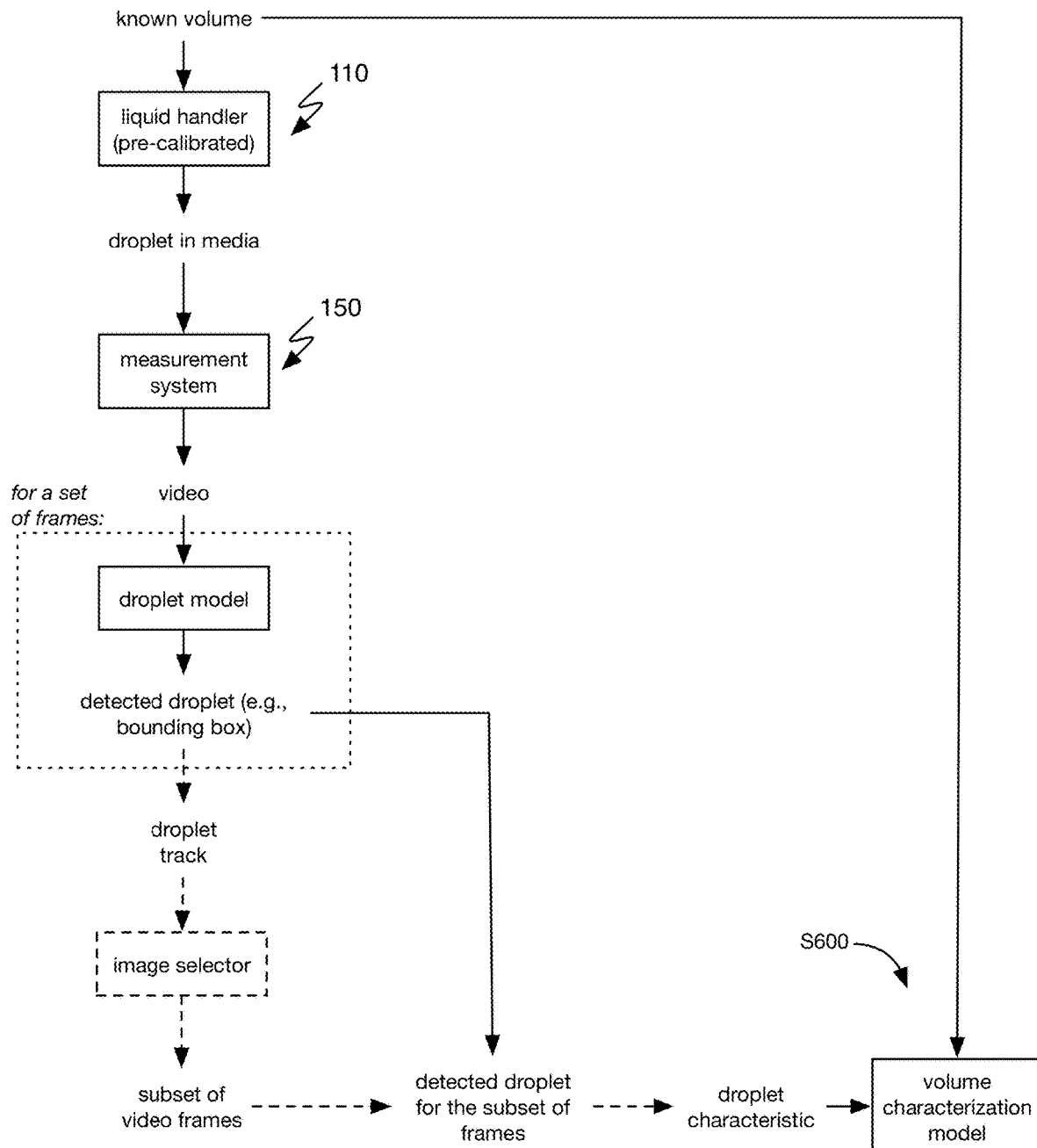
FIG. 6B depicts a second example of determining a volume characterization model.
Figure 6C:
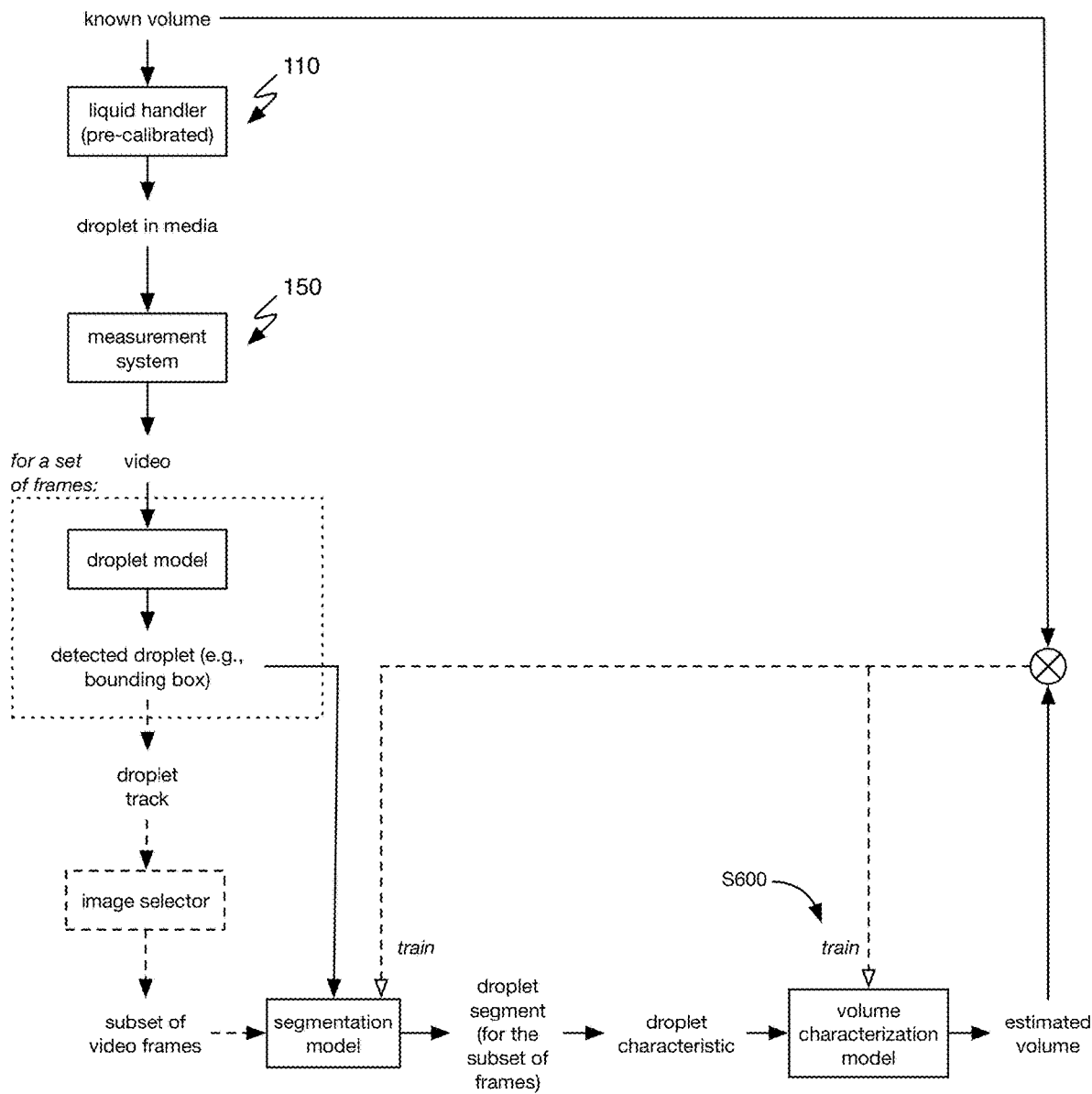
FIG. 6C depicts an example of training a volume characterization model and/or a segmentation model.

The droplet of interest can be segmented from each image in the subset of images. The droplet can be segmented using the droplet model during S310 and/or S320 (e.g., the droplet model outputs a droplet segment for each video frame; the droplet model outputs a bounding box that can be used as the droplet segment; etc.), but can alternatively be segmented using a separate segmentation model. The segmentation model can include classical image processing models and/or machine learning models. In specific examples, the segmentation model can include: semantic segmentation models, instance-based segmentation models, edge detection methods (e.g., Canny edge detector, thresholding, first order edge detection, second order edge detection, etc.), and/or any other segmentation methods. The segmentation model input can include the subset of images, the bounding box and/or bounding box parameters from the droplet of interest for each of the subset of images, and/or any other suitable inputs. The segmentation model output can be the droplet segment and/or any other suitable outputs. The segmentation model can optionally be trained (e.g., fine-tuning pixel selection) via S600 methods. An example is shown in FIG. 6C.

Determining a droplet characteristic can include analyzing the geometry of the droplet segment and/or of the droplet bounding box. The droplet characteristic can be a 2D geometric characteristic (e.g., shape, dimensions, area, radius, diameter, width, height, etc.), 3D geometric characteristic, a number of pixels, area (e.g., droplet segment size), and/or any other parameter. In a specific example, the droplet characteristic can be a dimension in one or more axes (e.g., horizontal radius/diameter, vertical radius/diameter, an axis on an angle, etc.), wherein the axis can be predetermined (e.g., always horizontal), determined using a model, determined using a set of heuristics (e.g., to select horizontal or vertical), and/or otherwise determined. The droplet characteristic is preferably a different characteristic than the geometric characteristic tracked in S320, but can alternatively be the same characteristic. In a first variant, the droplet characteristic is determined based on a number of pixels associated with the droplet silhouette. In a first example, the droplet characteristic is the total number of pixels within the droplet segment (e.g., the pixel area). In a second example, the droplet characteristic is based on the number of pixels across the diameter of the silhouette (e.g., an estimated diameter or radius of the droplet). In a second variant, the droplet characteristic is determined by fitting a shape (e.g., circle, ellipse, etc.) to the segmented droplet. For example, the droplet characteristic can be a dimension (e.g., diameter, radius, etc.) of the fitted shape.

However, the droplet characteristic can be otherwise determined.

Determining a droplet volume based on the droplet characteristic S380 preferably includes using the volume characterization model, but can alternatively use any other volume estimation technique. The droplet volume can be determined based on: the droplet characteristic of a single droplet, the droplet characteristics of multiple droplets (e.g., wherein the droplet characteristics can be aggregated), the detected boundaries or geometries of the droplet vessel 130, a fiducial, the refraction of the light through the droplet or the continuum media, and/or based on any other suitable information. In an example, the droplet vessel boundaries or other fiducial with known dimensions can be used as a reference to normalize droplet volume estimation (e.g., wherein the ratio of the droplet segment relative to the dimensions of the droplet vessel 130 is used to determine the droplet volume). In a first variant, the droplet characteristic is passed as an input to the volume characterization model (e.g., determined in S600), wherein the volume characterization model (e.g., a neural network) outputs the estimated droplet volume. In a second variant, the volume is directly calculated based on the droplet characteristic. For example, assuming (vertical) axial symmetry of the droplet, the 2D droplet silhouette shape (e.g., a circle fit to the silhouette) can be converted to a 3D shape (e.g., a sphere, ellipsoid, spheroid, etc.), wherein the droplet volume is estimated to be the volume of the 3D shape.

In a first example, the subset of images includes a single image, wherein the droplet characteristic and a corresponding droplet volume is determined for the single image. In a second example, the subset of images includes multiple images, wherein an intermediate droplet characteristic can be determined for each image in the subset of images, and the intermediate droplet characteristics can be aggregated (e.g., averaged, otherwise statistically transformed, etc.) to determine the droplet characteristic; a corresponding droplet volume can then be determined based on the droplet characteristic. In a third example, the subset of images includes multiple images, wherein an intermediate droplet characteristic can be determined for each image in the subset of images, and a corresponding intermediate droplet volume can be determined for each droplet characteristic; the intermediate droplet volumes can then be aggregated to determine the droplet volume.

However, the droplet volume can be otherwise determined.

The droplet volume can be stored in the database (e.g., in association with the droplet's identity, such as the droplet composition, dispensation parameters, and/or other information), compared to a target droplet volume, used to adjust liquid handling parameters and/or for other downstream methods, provided to a user, and/or otherwise used. In a specific example, the droplet volume can be measured before and/or after all or a portion of an experiment for quality control. In another specific example, the droplet volume can be stored in the database in association with the liquid handling parameters used to dispense the droplet, liquid characteristics of the droplet and/or continuum media, other measurements, and/or any other information. In a specific example, the droplet volume can be mapped to a pipettor pressure curve measured while dispensing the droplet, wherein an error can be raised for future dispensing events (for the same target volume and for the same or a similar droplet liquid type) when the pressure curve does not match the stored pressure curve.

The method can optionally include adjusting liquid handling parameters based on the droplet volume S400, which functions to calibrate the liquid handler 110, thus increasing dispensing volume accuracy of the liquid handler 110. Additionally or alternatively, adjusting the liquid handling parameters can include halting liquid handler operation (e.g., when the target droplet volume differs from the actual droplet volume by more than a threshold amount or proportion), triggering user notification, and/or otherwise controlling liquid handler operation. S400 can be performed after S300 and/or at any other time. The liquid handling parameters can be adjusted for the entire system, on a per-channel basis, on a channel-subset basis, and/or otherwise adjusted. The liquid handling parameters can be automatically adjusted, manually adjusted, determined using a third party, and/or otherwise adjusted. In an example, the adjusted liquid handling parameters can be presented as recommendations to a user.

Figure 3A:
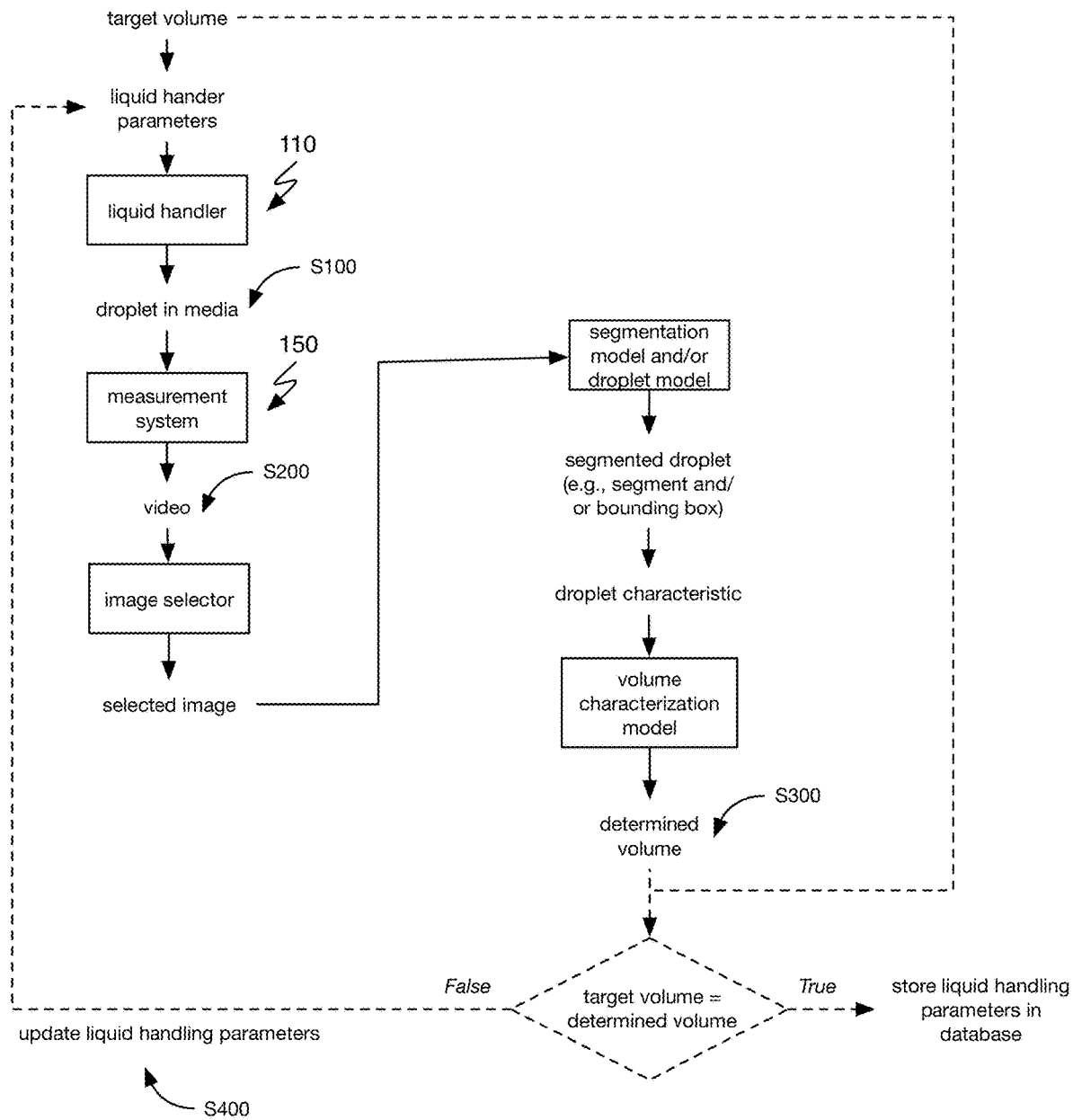
FIGS. 3A and 3B depict examples of the method, including determining a droplet volume and optionally calibrating a liquid handler based on the droplet volume.
Figure 3B:
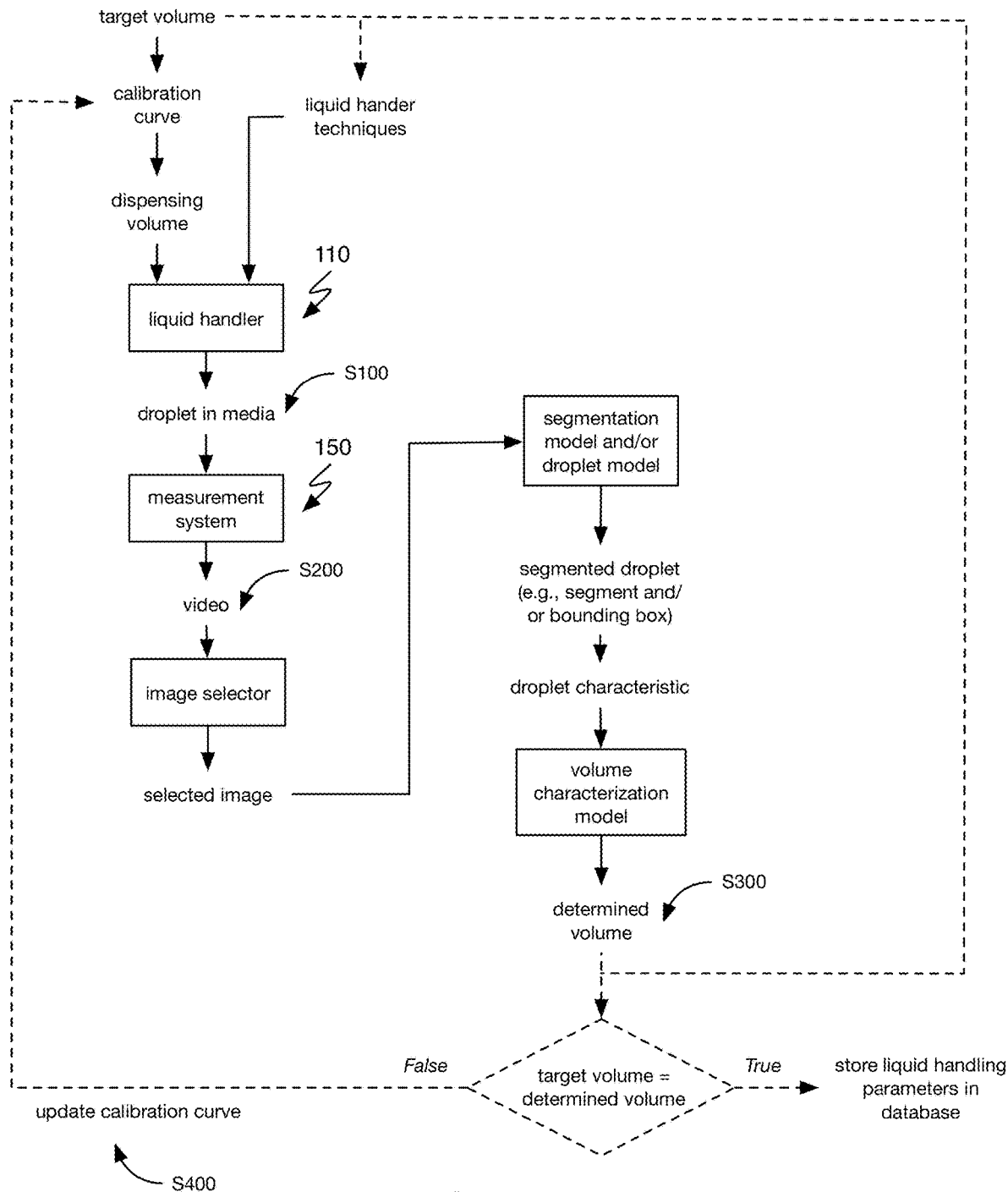

Adjusting the liquid handling parameters preferably includes comparing the droplet volume (e.g., determined in S300) and/or an overall volume (e.g., the sum of determined volumes for multiple droplets) to the target volume (e.g., set in S100), and adjusting the liquid handling parameters based on the comparison. For example, adjusting the set of liquid handling parameters can include adjusting the dispensing volume based on a comparison between the target volume and the determined droplet volume. In a specific example, the liquid handling parameters can be iteratively adjusted (e.g., repeating S100, S200, S300, and/or S400) until a condition is satisfied. The condition can be: a predetermined number of iterations, the determined droplet volume matches the target volume (e.g., within a threshold), and/or until any other stop condition. Examples are shown in FIG. 3A and FIG. 3B. In a first example, the liquid handling parameters can be adjusted using a model (e.g., a predictive model, a function, etc.) and/or lookup table to determine the change in liquid handling parameters needed to achieve the target volume, based on the current liquid handling parameters and current determined droplet volume. In a second example, the liquid handling parameter adjustments can include predetermined adjustments. In a specific example, dispensing parameters (e.g., dispensing volume) can be increased or decreased in predetermined steps depending on whether the determined droplet volume is below or above the target volume. In a third example, adjusting the liquid handling parameters can include selecting parameters within a parameter space (e.g., using Bayesian optimization techniques, sweeping through the parameter space, etc.). In a fourth example, the adjusted liquid handling parameters can be determined manually. The liquid handling parameter adjustments can optionally be determined based on additional information, including: the viscosity of droplet liquid (e.g., high viscosity liquids may require a larger increase in dispensing pressure for a given change in droplet volume), the viscosity of the continuum media, a number and/or geometric characteristic of air bubbles determined based on the set of measurements (e.g., determined using the droplet model), information in the database (e.g., previous liquid handling parameter adjustments and corresponding droplet volume changes), and/or any other information.

The liquid handling parameter adjustments can optionally vary for different droplets dispensed in a droplet array. In a specific example, liquid handling parameters can be adjusted for the first droplet and/or last droplet (e.g., to increase volume accuracy, to dispense the minimum amount of volume in these droplets if they are wasted, etc.).

The adjustments that result in the target droplet volume (e.g., within a margin of error) are preferably stored in the database for subsequent use (e.g., resulting in a calibrated liquid handler). In a specific example, the adjusted liquid handling parameters can be stored in associated with: an identifier for the droplet liquid and/or continuum media, liquid characteristics for the droplet liquid and/or continuum media, liquid handler specifications, target volume, and/or any other information. For example, the adjustments can be used to determine liquid handler control instructions (e.g., droplet dispensation instructions, dispensing volumes, etc.) when running experiments. In a first variant, a new mapping between liquid handling parameter values and the target droplet volumes can be determined and stored. In a second variant, the adjusted liquid handling parameters comprise corrected dispensing volumes, wherein a calibration curve relates target volumes to corrected (e.g., calibrated) dispensing volumes; an example is shown in FIG. 14. In a third variant, a correction can be calculated for the liquid handler 110, wherein the correction can be applied to the default control signal (for the target droplet volume) during operation. The correction can be a linear correction, a non-linear correction, and/or any other correction. However, the adjustment can be otherwise stored and implemented.

The calibrated liquid handler can optionally be used to perform one or more experiments. Specific examples of assays that can be performed using the liquid handler 110 (e.g., post-calibration) include: flow cytometry staining, immunoassays (ELISA), in-situ hybridization (FISH), spatial transcriptomics, flow analysis, experiments involving transferring liquids (e.g., dilutions), and/or any other liquid handling experiment assays.

However, the liquid handling parameters can be otherwise adjusted.

The method can optionally include determining a volume characterization model S600 which functions to determine actual droplet volume based on the droplet characteristic. The volume characterization model can optionally be trained to use a reference with known geometry or size (e.g., the droplet vessel 130, a fiducial on or near the droplet vessel 130, etc.) that appears within the inference images to determine the droplet volume. S600 can be performed before S100 (e.g., before inference) and/or at any other time. The volume characterization model is preferably rarely redetermined (e.g., retrained) or not redetermined, but can alternatively be frequently redetermined.

In a first variant, the volume characterization model includes an algorithm calculating the volume for a 3D shape based on a dimension of the 3D shape (e.g., wherein the dimension is the droplet characteristic and/or is calculated based on the droplet characteristic). For example, the volume characterization model can be a model for a sphere, an ellipsoid, a spheroid, and/or any other shape. In a second variant, the volume characterization model can be trained based on droplet segments or droplet images labeled with a known droplet volume. The training droplets can include a variety of liquid types, a variety of droplet sizes, and/or a variety of continuum media types. Examples are shown in FIG. 6A, FIG. 6B, and FIG. 6C. In an example, generating volume characterization model training data can include: dispensing training droplets (e.g., via S100 methods) using a pre-calibrated liquid handler or pre-calibrated pipettes, wherein the target volume for the training droplets is equal to the actual droplet volume (e.g., within a tolerance). The volume characterization model can then be trained to predict the actual droplet volume for the training droplets based on the droplet characteristic for the training droplet (e.g., wherein the droplet characteristic is determined using methods in S200 and/or S300).

Figure 13:
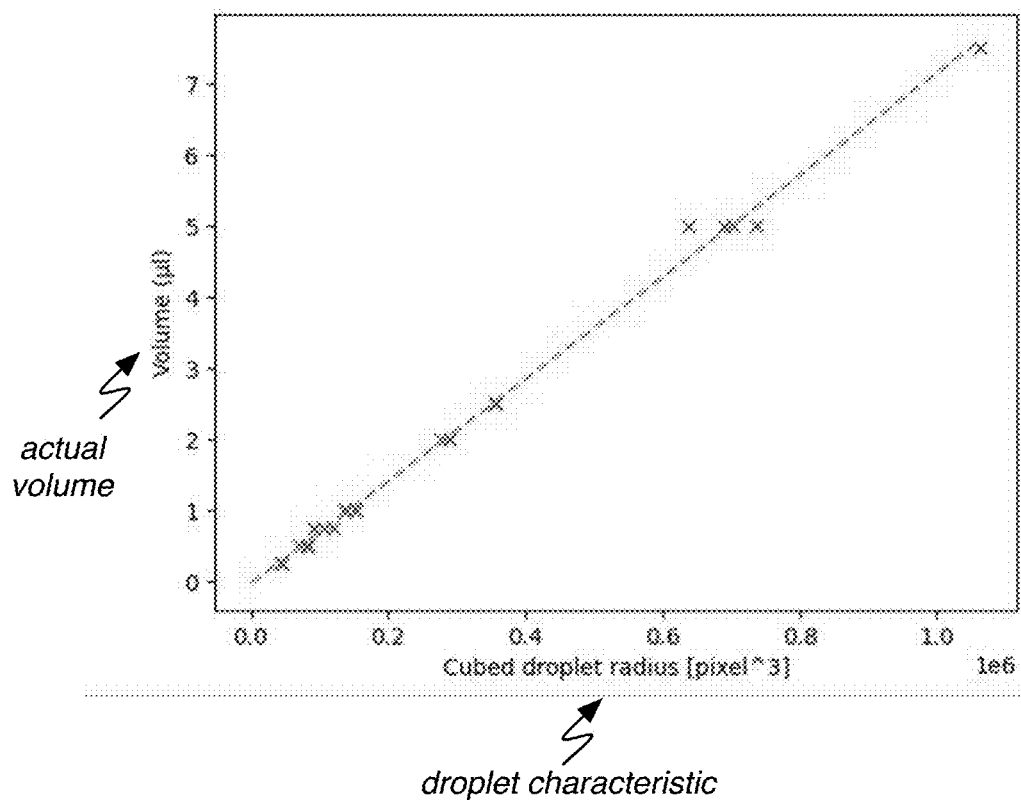
FIG. 13 depicts an illustrative example of a volume characterization model.

The volume characterization model can be linear, nonlinear (e.g., cubic), and/or any other model. The volume characterization model can include an assumption of droplet symmetry (e.g., symmetry in one or more axes) or not include an assumption of droplet symmetry. In an example, the volume characterization model can include a linear relationship between the droplet characteristic and the volume. In a specific example, the volume characterization model is a regression fit to data including droplet characteristics and the corresponding actual droplet volumes. In an illustrative example, the droplet characteristic is the cubed droplet radius (e.g., wherein the radius is in pixels), and the volume characterization model is a linear regression between the actual droplet volume and the cubed droplet radius (e.g., with the assumption that the droplet is a sphere). An example is shown in FIG. 13. In another illustrative example, the droplet characteristic is the droplet vertical radius multiplied by the squared droplet horizontal radius, and the volume characterization model is a linear regression between the actual droplet volume and the droplet characteristic (e.g., with the assumption that the droplet is an ellipsoid exhibiting vertical axial symmetry).

However, the volume characterization model can be otherwise determined.

In variants, the method can optionally include receiving a set of assay tolerances (e.g., volume ranges, precision, accuracy, etc.), and determining a confidence level of the system 100 achieving the set of assay tolerances (e.g., based on the liquid calibration, etc.). Additionally or alternatively, the method can include adjusting and/or designing experiments based on the liquid handler specifications and/or assay tolerances. In an example, the system 100 can interface with a (third-party) experiment feedback analytic system, wherein the target volume and droplet volume can be provided to the analytic system, and the analytic system is used to determine adjusted experiment protocols.

Different subsystems and/or modules discussed above can be operated and controlled by the same or different entities. In the latter variants, different subsystems can communicate via: APIs (e.g., using API requests and responses, API keys, etc.), requests, and/or other communication channels.

Alternative embodiments implement the above methods and/or processing modules in non-transitory computer-readable media, storing computer-readable instructions that, when executed by a processing system, cause the processing system to perform the method(s) discussed herein. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), contemporaneously (e.g., concurrently, in parallel, etc.), or in any other suitable order by and/or using one or more instances of the systems, elements, and/or entities described herein. Components and/or processes of the following system and/or method can be used with, in addition to, in lieu of, or otherwise integrated with all or a portion of the systems and/or methods disclosed in the applications mentioned above, each of which are incorporated in their entirety by this reference.

As a person skilled in the art will recognize from the previous detailed description and from the figures and claims, modifications and changes can be made to the preferred embodiments of the invention without departing from the scope of this invention defined in the following claims.

We claim:

1. A method, comprising:
   using a liquid handling robot, dispensing a droplet from a pipette tip based on a set of liquid handling parameters for the liquid handling robot;
   sampling a set of images of the droplet;
   selecting a subset of images from the set of images, the subset of images comprising images sampled after the droplet has separated from the pipette tip;
   determining an estimated volume of the droplet based on the subset of images; and
   adjusting the set of liquid handling parameters based on the estimated volume.

2. The method of claim 1, further comprising:
   detecting the droplet in the set of images; and
   tracking a location of the droplet in the set of images, wherein the subset of images is selected based on the tracked location.

3. The method of claim 2, wherein the droplet is detected in the set of images using a classifier, wherein the classifier distinguishes between air bubbles and liquid droplets.

4. The method of claim 1, further comprising tracking a geometric characteristic of the droplet in the set of images, wherein the subset of images is selected based on the tracked geometric characteristic.

5. The method of claim 1, wherein selecting the subset of images from the set of images comprises determining that the subset of images satisfies a set of criteria, the set of criteria comprising the droplet not touching the pipette tip.

6. The method of claim 5, wherein the set of criteria further comprises the droplet not touching other droplets.

7. The method of claim 1, further comprising:
segmenting the droplet within the subset of images; and
determining a geometric characteristic for the segmented droplet, wherein the estimated volume of the droplet is determined based on the geometric characteristic, using a model for calculating a volume for a three-dimensional shape.

8. The method of claim 7, wherein the three-dimensional shape comprises a spheroid.

9. The method of claim 1, further comprising:
dispensing a second droplet using the liquid handling robot;
sampling a second set of images of the second droplet;
selecting a second subset of images from the second set of images; and
determining an estimated volume of the second droplet based on the second subset of images, wherein the set of liquid handling parameters are adjusted based on a sum of the estimated volume of the droplet and the estimated volume of the second droplet.

10. The method of claim 1, wherein the set of liquid handling parameters comprises at least one of: flow rate, blow out volume, stop back volume, air transport volume, swap speed, or settling time.

11. A system, comprising:
a vessel holding a first liquid, wherein a liquid handling robot is configured to dispense a droplet of a second liquid into the first liquid according to a set of liquid handling parameters,
a camera configured to sample a set of images of the droplet; and
a computing system configured to:
detect the droplet in the set of images using a droplet model, wherein the droplet model distinguishes between air bubbles and liquid droplets; and
determine an estimated volume of the droplet based on the set of images using a volume characterization model.

12. The system of claim 11, further comprising a translation system coupled to at least one of the camera or the vessel, wherein the camera system is calibrated by adjusting a distance between the camera and the vessel using the translation system.

13. The system of claim 11, further comprising a fiducial, wherein a location of the fiducial is associated with a location of the vessel, wherein the camera is configured to sample an image of the fiducial, wherein the camera is calibrated based on the image of the fiducial.

14. The system of claim 11, further comprising a light source, a diffuser, and a collimator, wherein the light source is configured to illuminate the vessel by emitting light through the diffuser and collimator.

15. The system of claim 11, further comprising a platform, wherein the vessel and the camera are coupled to the platform, wherein the platform interfaces with a deck of the liquid handler.

16. The system of claim 11, wherein the first liquid comprises oil.

17. The system of claim 11, wherein the vessel is refillable.

18. The system of claim 11, wherein the vessel is prefilled with the first liquid.

19. The system of claim 11, wherein the liquid handling robot is configured to dispense the droplet based on a target volume, wherein the set of liquid handling parameters comprises a dispensing volume, wherein the dispensing volume is adjusted based on a comparison between the target volume and the estimated volume.

20. The system of claim 11, further comprising a database, wherein the computing system is further configured to determine adjusted liquid handling parameters based on the estimated volume, wherein the adjusted liquid handling parameters are stored in the database in association with an identifier for the second liquid.

* * * * *